United States Patent
Olson et al.

(10) Patent No.: US 7,278,198 B2
(45) Date of Patent: Oct. 9, 2007

(54) MANDREL SEGMENT LOADER

(75) Inventors: Vincent T. Olson, Mukilteo, WA (US);
Richard E. Koppelmann, Burden, KS (US); Peter Berntsson, Bjurholm (SE);
Johnny Pettersson, Bjurholm (SE)

(73) Assignee: The Boeing Company, Chicago, IL (US)

( * ) Notice: Subject to any disclaimer, the term of this patent is extended or adjusted under 35 U.S.C. 154(b) by 248 days.

(21) Appl. No.: 11/048,390

(22) Filed: Feb. 1, 2005

(65) Prior Publication Data

US 2006/0180704 A1    Aug. 17, 2006

(51) Int. Cl.
*B23Q 3/00* (2006.01)
*B64F 5/00* (2006.01)

(52) U.S. Cl. .......................... 29/464; 29/448; 29/559; 29/281.1; 29/281.4; 414/222.01; 414/225.01; 414/589; 414/591; 212/270; 212/327

(58) Field of Classification Search .............. 29/281.1, 29/281.4, 464, 559, 448; 269/45, 55, 58, 269/71, 909, 904; 414/222.01, 225.01, 226.05, 414/591, 589, 590; 212/312, 314, 327, 270
See application file for complete search history.

(56) References Cited

U.S. PATENT DOCUMENTS

| 2,378,043 | A | * | 6/1945 | Sorensen et al. ............. 29/464 |
|---|---|---|---|---|
| 3,692,601 | A | | 9/1972 | Hardesty et al. |
| 3,879,245 | A | | 4/1975 | Fetherson et al. |
| 4,064,534 | A | | 12/1977 | Chen et al. |
| 4,310,132 | A | | 1/1982 | Frosch |
| 4,548,859 | A | | 10/1985 | Kline et al. |
| 4,573,859 | A | * | 3/1986 | Amano et al. .............. 414/628 |
| 4,608,220 | A | | 8/1986 | Caldwell |
| 4,693,678 | A | | 9/1987 | Von Volkli |
| 4,699,683 | A | | 10/1987 | McCowin |
| 4,760,444 | A | | 7/1988 | Nielson et al. |
| 4,780,262 | A | | 10/1988 | Von Volkli |
| 4,790,898 | A | | 12/1988 | Woods |
| 4,830,298 | A | | 5/1989 | Van Blunk |

(Continued)

FOREIGN PATENT DOCUMENTS

| DE | 20 53 427 A | 5/1971 |
|---|---|---|
| DE | 4209812 A1 * | 9/1993 |
| EP | 046 015 A | 2/1982 |
| EP | 0 198 744 A | 10/1986 |

OTHER PUBLICATIONS

U.S. Appl. No. 10/851,381.

(Continued)

*Primary Examiner*—Essama Omgba
(74) *Attorney, Agent, or Firm*—Ingrassia Fisher & Lorenz, P.C.

(57) ABSTRACT

A mandrel segment loader provides a reliable means of assembling the segments of a large multi-piece mandrel designed for the lay-up of composite materials in the manufacture of large structures such as one-piece fuselage barrels for wide-body aircraft and can also be used for removing the mandrel from the finished fuselage barrel by disassembling the segments. The mandrel segment loader provides transport and multi-axis positioning for the segments, which may weigh as much as 25,000 pounds, with linear positioning resolution in the realm of 0.002 inch and rotational positioning resolution in the realm of 0.005 degree. The mandrel segment loader is also more generally useful as a material handling system that can perform many useful manufacturing functions, such as loading passenger floors into a fuselage barrel when assembling an aircraft. Self-locking grippers prevent accidental self-release of a load.

19 Claims, 16 Drawing Sheets

U.S. PATENT DOCUMENTS

| | | | |
|---|---|---|---|
| 4,877,471 A | | 10/1989 | McCowin et al. |
| 4,941,182 A | | 7/1990 | Patel |
| 5,024,399 A | | 6/1991 | Barquet |
| 5,058,497 A | | 10/1991 | Bishop et al. |
| 5,072,506 A | * | 12/1991 | Dacey, Jr. ............... 29/464 |
| 5,337,647 A | | 8/1994 | Roberts et al. |
| 5,439,549 A | | 8/1995 | Fryc et al. |
| 5,450,147 A | | 9/1995 | Dorsey-Palmateer |
| 5,540,126 A | | 7/1996 | Piramoon |
| 5,560,102 A | * | 10/1996 | Micale et al. ............. 29/897.2 |
| 5,651,600 A | | 7/1997 | Dorsey-Palmateer |
| 5,664,311 A | * | 9/1997 | Banks et al. ............. 29/407.04 |
| 5,683,646 A | | 11/1997 | Reiling, Jr. |
| 5,700,337 A | | 12/1997 | Jacobs et al. |
| 5,746,553 A | | 5/1998 | Engwall |
| 5,804,276 A | | 9/1998 | Jacobs et al. |
| 5,814,386 A | | 9/1998 | Vasiliev et al. |
| 5,871,117 A | | 2/1999 | Protasov et al. |
| 5,918,358 A | * | 7/1999 | Ffield et al. ............. 29/559 |
| 5,963,660 A | | 10/1999 | Koontz et al. |
| 5,979,531 A | | 11/1999 | Barr et al. |
| 6,012,883 A | | 1/2000 | Engwall et al. |
| 6,013,341 A | | 1/2000 | Medvedev et al. |
| 6,045,651 A | | 4/2000 | Kline et al. |
| 6,074,716 A | | 6/2000 | Tsotsis |
| 6,086,696 A | | 7/2000 | Gallagher |
| 6,112,792 A | | 9/2000 | Barr et al. |
| 6,168,358 B1 | | 1/2001 | Engwall et al. |
| 6,205,239 B1 | | 3/2001 | Lin et al. |
| 6,364,250 B1 | | 4/2002 | Brinck |
| 6,390,169 B1 | | 5/2002 | Johnson |
| 6,415,510 B2 | * | 7/2002 | Mertens et al. ............ 29/897.2 |
| 6,451,152 B1 | | 9/2002 | Holmes et al. |
| 6,480,271 B1 | | 11/2002 | Cloud et al. |
| 6,546,616 B2 | * | 4/2003 | Radowick .............. 29/720 |
| 6,648,273 B2 | | 11/2003 | Anast |
| 6,692,681 B1 | | 2/2004 | Lunde |
| 6,799,619 B2 | | 10/2004 | Holmes et al. |
| 6,855,099 B2 | * | 2/2005 | Hazlehurst et al. ........... 483/38 |
| 6,859,989 B2 | * | 3/2005 | Bauer et al. .............. 29/559 |
| 6,979,288 B2 | * | 12/2005 | Hazlehurst et al. ........... 483/1 |
| 2002/0141632 A1 | | 10/2002 | Engelbart et al. |

OTHER PUBLICATIONS

U.S. Appl. No. 10/846,974, filed May 14, 2004, Engelbart et al.
U.S. Appl. No. 10/822,538, filed Mar. 12, 2004, Engelbart et al.
U.S. Appl. No. 10/799,306, Engelbart et al.
U.S. Appl. No. 10/726,099, Engelbart et al.
U.S. Appl. No. 10/717,030, Johnson et al.
U.S. Appl. No. 10/664,148, Engelbart et al.
U.S. Appl. No. 10/646,509, Johnson et al.
U.S. Appl. No. 10/646,392, Engwall et al.
U.S. Appl. No. 10/646,316, New et al.
U.S. Appl. No. 10/630,594, Braun.
U.S. Appl. No. 10/628,691, Engelbart et al.
U.S. Appl. No. 10/301,949, Nelson.
U.S. Appl. No. 10/217,805, Engelbart et al.
U.S. Appl. No. 10/068,735, Engelbart et al.
U.S. Appl. No. 11/001,803, Zaballos et al.
U.S. Appl. No. 11/005,667, Lum et al.
http://www.cinmach.com/WolfTracks4_1/MTG_WT7.htm: Premier I Features Lighter, Stronger All-Composite Fuselage, 3 pages.
http://www.cinmach.com/compnews/PressReleases/pr00-11.htm: Raytheon Aircraft Orders Four More Fiber Cincinnati Fiber Placement Systems for Industry's First Composite-Fuselage Business, Jets, 2 pages.
http://www.rockymountaincomposites.com/wind_sys.htm; Filament Winding, 2 pages.
Fiedler, L., et al., "*Tango Composite Fuselage Platform*", SAMPE Journal, vol. 39, No. 1, Jan./Feb. 2003, pp. 60.
BAe 146, Flight International, May 2, 1981, 1 page.
A Barrelful of Experience, Intervia, May 1992, 2 pages.
Raytheon, Mar. 2000, vol. 4, No. 2 http://www.cts.com/king/vasci/newsletter/vol42.html.
Business Aviation, Jun. 7, 2002, http://www.aviation.com/avnow/news/channel/busav.jsp?view=news/btoyo0607.xml.
Beechcraft's Composite Challenge, http://www.aerotalk.com/beech.cfm.
Evans, Don O., "*Fiber Placement*", 3 pages, Cincinnati Machine, pp. 477-479.
Azco Corp., http://www.azcocorp.com/products/sur-cut-quillotine-knife-assemblies.php, "SUR-CUT™ Guillotine Knife Assemblies", 2004, Azco Corp., Fairfield, NJ, USA.
"Mobility Solutions" ("Wheel Units"), http://www.maxmove.se/, (Aug. 2004) © MaxMove AB, Bjurholm, Sweden.

\* cited by examiner

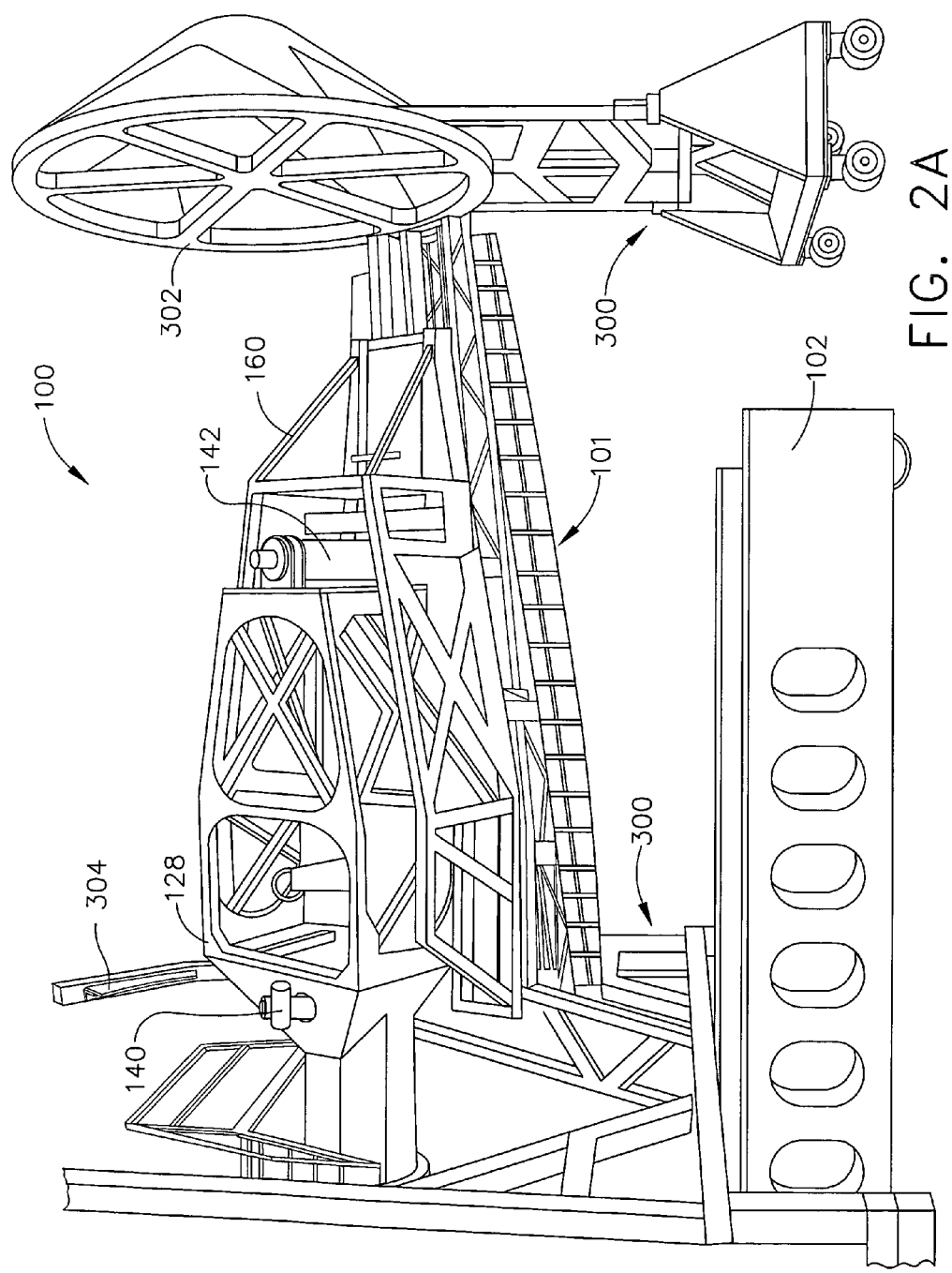

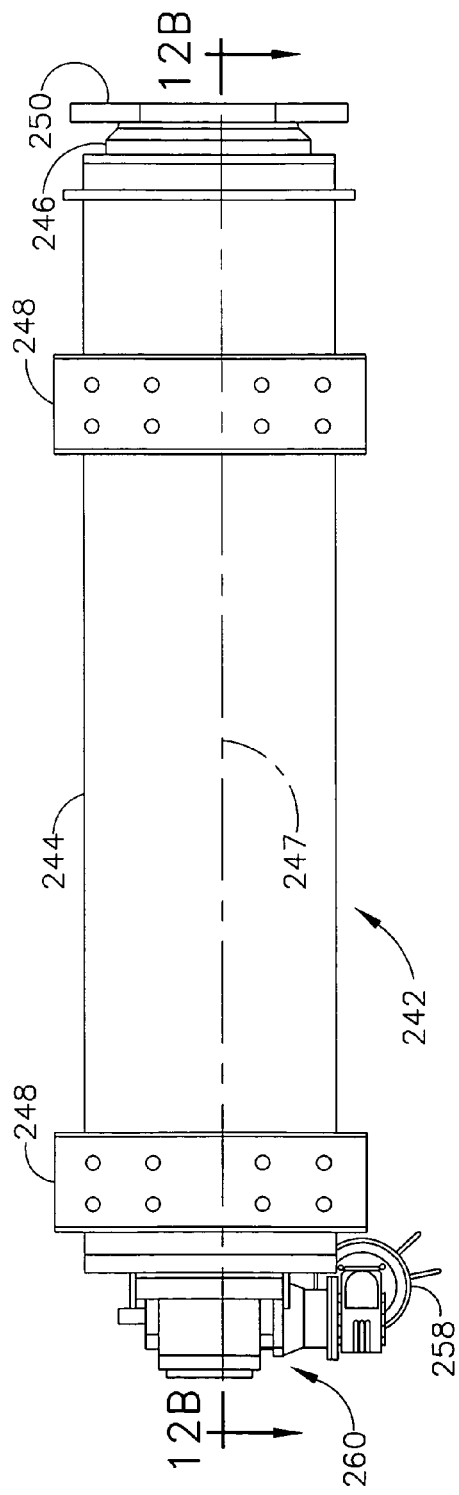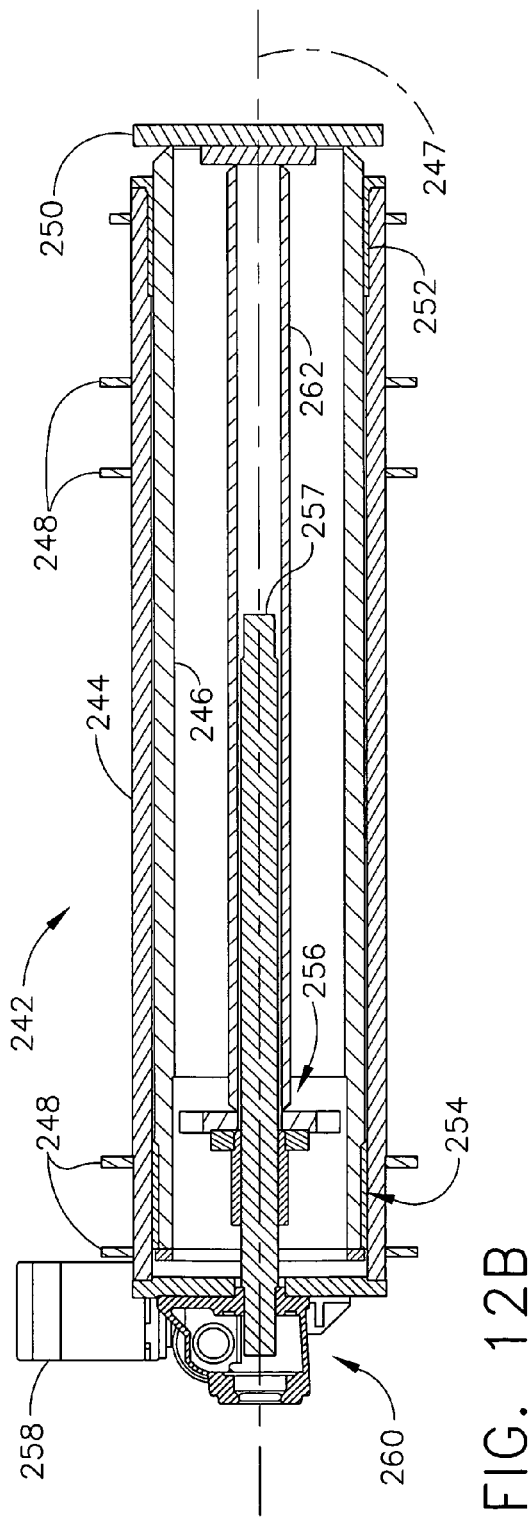
FIG. 12A
FIG. 12B

MANDREL SEGMENT LOADER

CROSS REFERENCE TO RELATED APPLICATIONS

The present application is related to the following co-pending United States patent applications: U.S. application Ser. No. 10/851,381, filed May 20, 2004; U.S. application Ser. No. 10/822,538, filed Apr. 12, 2004; U.S. application Ser. No. 10/717,030, filed Nov. 18, 2003; U.S. application Ser. No. 10/646,509, filed Aug. 22, 2003; U.S. application Ser. No. 10/646,392, filed Aug. 22, 2003; U.S. application Ser. No. 10/646,316, filed Aug. 22, 2003; U.S. application Ser. No. 10/630,594, filed Jul. 28, 2003; and U.S. application Ser. No. 10/301,949, filed Nov. 22, 2002.

BACKGROUND OF THE INVENTION

The present invention generally relates to manufacturing of large structures using composite materials and, more particularly, to a large, mobile robotic arm for manipulation of the mandrels used for laying up composite laminate material for the manufacture of large aircraft fuselage sections.

The structural performance advantages of composites, such as carbon fiber epoxy and graphite bismaleimide (BMI) materials, are widely known in the aerospace industry. Aircraft designers have been attracted to composites, for example, because of their superior stiffness, strength, and lower weight. As more advanced materials and a wider variety of material forms have become available, aerospace usage of composites has increased. Composite materials have been applied using contour tape laminating machines (CTLM) and automated fiber placement machines (AFPM), for example, in the manufacture of parts such as wing panels and empennage. New and innovative composite lamination technologies are envisioned, such as the manufacture of large aircraft fuselage sections that may exceed, for example, 15 to 20 feet in diameter. New super-efficient aircraft—with the majority of the primary structure, including the fuselage and wing, made of composite materials—are contemplated that, in addition to bringing big-jet ranges to mid-size airplanes, will provide airlines with unmatched fuel efficiency, resulting in exceptional environmental performance. It is expected that such aircraft may use 20 percent less fuel for comparable missions than any other current wide-body airplane yet be able to travel at speeds similar to today's fastest wide-bodies, about Mach 0.85, and provide 40 to 60 percent more cargo revenue capacity.

For the manufacturing of comparatively smaller parts, such as wing panels and empennage, the CTLM and AFPM technologies have become highly developed. Since composite materials have material characteristics that differ from traditional aircraft materials, however, it will generally not be possible to use existing facilities and equipment for the construction and assembly of the new, large, composite material aircraft. For example, the large fuselage sections to be made out of a composite material, and which can be described as having a one-piece barrel shape, could be approximately 24 feet long with a diameter of about 20 feet and, therefore, quite large. This large fuselage barrel is a one-piece composite part that could be built by being laid up on a large, multi-piece mandrel whose outer surface is the inner mold line (IML) of the aircraft fuselage. The multi-piece mandrel must be assembled from segments prior to lay-up and disassembled after part cure, i.e., after curing of the composite material, such as a graphite/epoxy, the inner mold line mandrel needs to be removed. A method and equipment will be required for assembling and disassembling the large, heavy mandrel segments.

SUMMARY OF THE INVENTION

A mandrel segment loader provides a reliable means of assembling the segments of a large multi-piece mandrel between the rings of a fixed ring assembly and disassembly station (FRADS). The multi-piece mandrel, for example, may be an inner mold line mandrel specifically designed for the lay-up of composite materials in the manufacture of large structures such as one-piece fuselage barrels for wide-body aircraft. The mandrel segment loader can also be used to pull the mandrel segments out again from the center of the finished fuselage barrel, by disassembling the segments from between the rings of the FRADS. The mandrel segment loader can also be used to transport mandrel segments, e.g., between different workstations on the factory floor.

In one embodiment of the present invention, a material handling system includes an arm that rotates about an A-axis. The arm has a $Z_1$-axis in fixed relation to the arm and perpendicular to the A-axis, and has a $Z_2$-axis in fixed relation to the arm and parallel to the $Z_1$-axis so that the $Z_1$-axis and $Z_2$-axis rotate together about the A-axis. The system also includes a bridge carried by the arm. The bridge has a $Y_1$-axis maintained perpendicular to the $Z_1$-axis and a $Y_2$-axis maintained perpendicular to the $Z_2$-axis. The bridge also has an $X_1$-axis maintained perpendicular to the $Y_2$-axis.

The bridge translates relative to the arm along the $Z_1$-axis and $Z_2$-axis independently and translates relative to the arm along the $Y_1$-axis and $Y_2$-axis independently. A first gripper and a second gripper are provided for gripping the material. The first gripper and second gripper are carried by the bridge and translate along the $X_1$-axis of the bridge. The first gripper and the second gripper are translated along the $Z_1$-axis and $Z_2$-axis differentially to produce rotation about a virtual B-axis perpendicular to the $Z_1$-axis and $Z_2$-axis. In addition, the first gripper and the second gripper are translated along the $Y_1$-axis and $Y_2$-axis differentially to produce rotation about a virtual C-axis perpendicular to the $Y_1$-axis and $Y_2$-axis.

In another embodiment of the present invention, a gripper includes a main pivot; a thumb for engaging a bar attached to a load, and a finger for engaging the bar attached to the load. The thumb pivots about the main pivot and has a thumb pivot connecting to a thumb control link. The finger pivots about the main pivot in opposition to the thumb and has a finger pivot connecting to a finger control link. An actuator rod has an actuator pivot connected to the thumb control link that is connected to the thumb pivot. The actuator pivot is also connected to the finger control link that is connected to the finger pivot.

Movement of the actuator rod in a first direction transmits force through the thumb control link and finger control link to close the thumb and finger for engaging the bar attached to the load. Counter force tending to open the finger and thumb is transmitted back through the thumb control link and finger control link to push the actuator rod in the first direction closing the thumb and finger to provide the self-locking characteristic of the gripper.

In still another embodiment of the present invention, a mandrel segment loader includes a bridge that translates relative to an arm in the directions of a $Z_1$-axis, a $Y_1$-axis, a $Z_2$-axis, and a $Y_2$-axis all independently of each other. The $Z_1$-axis and $Y_1$-axis are perpendicular, and the $Z_2$-axis and $Y_2$-axis are perpendicular. The $Z_1$-axis and $Z_2$-axis are parallel and maintained in fixed relation to each other and the arm. Coordinated motion of the bridge in the directions of the $Y_1$-axis and the $Y_2$-axis provides rotation about a C-axis that is a virtual axis perpendicular to the $Y_1$-axis and $Y_2$-axis. Coordinated motion of the bridge in the directions of the $Z_1$-axis and the $Z_2$-axis provides rotation about a B-axis that is a virtual axis perpendicular to the $Z_1$-axis and $Z_2$-axis. A self-locking gripper translates relative to the bridge in the direction of an $X_1$-axis relative to the bridge and rotates about an A'-axis relative to the bridge.

In a further embodiment of the present invention, a method of material handling includes the operations of: gripping the material using a first gripper and a second gripper; carrying the first gripper and second gripper on a bridge having a $Y_1$-axis maintained perpendicular to a $Z_1$-axis and a $Y_2$-axis maintained perpendicular to a $Z_2$-axis, the bridge also having an $X_1$-axis maintained perpendicular to the $Y_2$-axis; and rotating the bridge about an A-axis on an arm, the arm having the $Z_1$-axis in fixed relation to the arm and perpendicular to the A-axis, and having the $Z_2$-axis in fixed relation to the arm and parallel to the $Z_1$-axis so that the $Z_1$-axis and $Z_2$-axis rotate together about the A-axis. The method also includes the operations of: translating the bridge relative to the arm along the $Z_1$-axis and $Z_2$-axis independently and translating the bridge relative to the arm along the $Y_1$-axis and $Y_2$-axis independently; translating the first gripper and the second grippers together along the $X_1$-axis; translating the first gripper and the second gripper along the $Z_1$-axis and the $Z_2$-axis differentially to produce rotation about a virtual B-axis perpendicular to the $Z_1$-axis and $Z_2$-axis; and translating the first gripper and the second gripper along the $Y_1$-axis and the $Y_2$-axis differentially to produce rotation about a virtual C-axis perpendicular to the $Y_1$-axis and $Y_2$-axis.

In a still further embodiment of the present invention, a method of assembling aircraft includes the steps of: gripping a mandrel segment; and accurately positioning the mandrel segment relative to a ring of a fixed ring assembly and disassembly station.

These and other features, aspects and advantages of the present invention will become better understood with reference to the following drawings, description and claims.

BRIEF DESCRIPTION OF THE DRAWINGS

FIG. 2A is a perspective view of a mandrel segment loader positioning a mandrel segment between rings of a fixed ring assembly and disassembly station (FRADS) according to one embodiment of the present invention.

FIG. 12A is a side view of an actuator of the material handling system shown in FIG. 1.

FIG. 12B is a cross sectional view of an actuator taken generally along line 12B-12B of FIG. 12A.

DETAILED DESCRIPTION OF THE INVENTION

Figure 1:
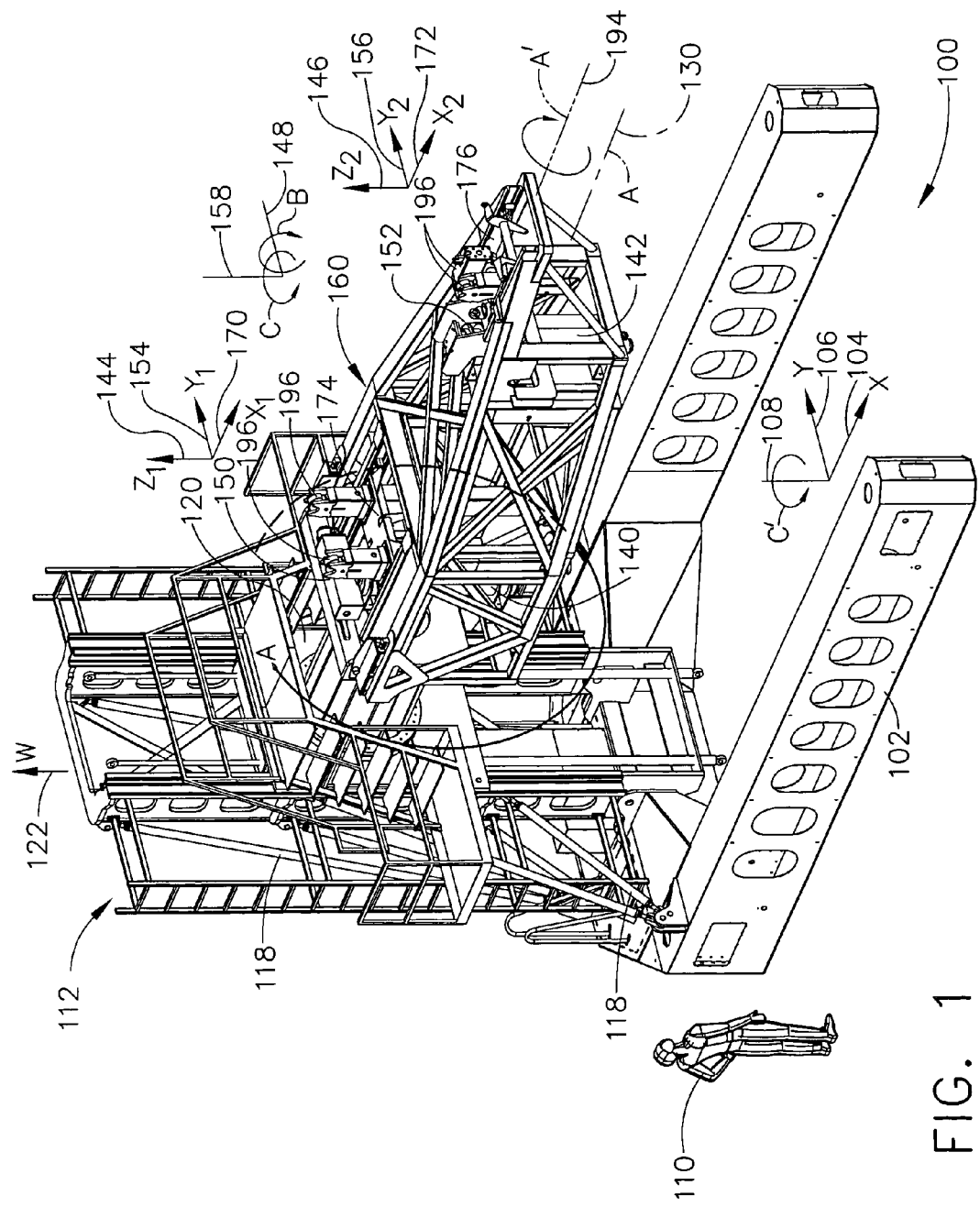
FIG. 1 is a perspective view of a material handling system in accordance with one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The Boeing Company is exploring a variety of methods and tools for making large composite structures. The present application describes an invention that is one of a family of inventions for accomplishing this goal. The present application is related to the following co-pending United States patent applications that are part of this family: U.S. application Ser. No. 10/851,381, filed May 20, 2004, entitled "Composite Barrel Sections for Aircraft Fuselages and Other Structures, and Methods and Systems for Manufacturing such Barrel Sections"; U.S. application Ser. No. 10/822,538, filed Apr. 12, 2004, entitled "Systems and Methods for Using Light to Indicate Defect Locations on a Composite Structure"; U.S. application Ser. No. 10/717,030, filed Nov. 18, 2003, entitled "Method of Transferring Large Uncured Composite Laminates"; U.S. patent application Ser. No. 10/646,509, entitled "Multiple Head Automated Composite Laminating Machine For The Fabrication Of Large Barrel Section Components", filed Aug. 22, 2003; U.S. patent application Ser. No. 10/646,392, entitled "Automated Composite Lay-Up To An Internal Fuselage Mandrel", filed Aug. 22, 2003; U.S. patent application Ser. No. 10/646,316, entitled "Unidirectional, Multi-Head Fiber Placement", filed Aug. 22, 2003; U.S. patent application Ser. No. 10/630,594, entitled "Composite Fuselage Machine", filed Jul. 28, 2003; and U.S. patent application Ser. No. 10/301,949, entitled "Parallel Configuration Composite Material Fabricator", filed Nov. 22, 2002; which are incorporated by reference.

Broadly, the present invention provides innovative methods and equipment for the construction and assembly of large aircraft from composite materials—such as large, one-piece, composite fuselage barrels that may approach or exceed 20 feet in maximum cross section ("diameter") and 24 feet in length. Embodiments of the present invention provide methods and equipment for assembling and disassembling large, heavy mandrel segments of a multi-piece mandrel used for the lay-up of large composite parts. Such a large, multi-piece mandrel, for example, may have an outer lay-up surface that is the inner mold line (IML) of the fuselage for a wide-body aircraft and the segments may be assembled between the rings of a fixed ring assembly and disassembly station (FRADS). The material handling system of one embodiment may be realized by a mandrel segment loader that can also be used to transport mandrel segments, for example, between different workstations on the factory floor. In addition, the material handling system of one embodiment can be used in a transport and assembly/disassembly mode for other purposes such as loading passenger floor structures into the fuselage barrel when assembling an aircraft. The material handling system of one embodiment also can be used in a manlift mode, for example—along with scaffolding that may be attachable to a gripper interface—to allow a mechanic access to the mandrel segments during assembly and disassembly. The material handling system of one embodiment can also be used in a mandrel segment preparation mode, for example, to allow a mechanic to clean and apply release agent to the mandrel segment in an ergonomic orientation.

Using the mandrel segment loader of one embodiment, the inner mold line, multi-piece mandrel can be assembled prior to lay-up of a fuselage barrel built by being laid up on the large, multi-piece mandrel. The mandrel can be removed from the fuselage barrel after part cure, i.e., after curing of the composite material, such as a graphite/epoxy, by disassembling the multi-piece mandrel while using the mandrel segment loader to support and remove the segments from the inside of the cured composite fuselage barrel as each segment is disassembled from the mandrel and from between the rings of the FRADS.

One embodiment is a novel mobile material handling system that can transport mandrel segments, rotate around any point on the factory floor, crab sideways, or move at any angle. The material handling system of one embodiment includes seven axes of motion that allow a mandrel segment loader to position mandrel segments accurately between the rings of the FRADS with the degree of accuracy required for reliable assembly (and disassembly) of the mandrel and in a wide array and combination of movements that is novel in the art of manipulating large heavy objects. A mandrel segment may have a width, for example, of about 10 feet, a length of about 25 feet up to 28 feet, and may weigh in the neighborhood of 10,000 pounds. The material handling system of one embodiment, for example, can manipulate and position loads in a range from any load that is not too small to be provided with a gripper interface (e.g., 100 pounds) up to loads of approximately 25,000 pounds with linear positioning resolution in the range of 0.002 to 0.005 inch and angular positioning resolution in the range of 0.005 to 0.01 degrees.

Figure 2:
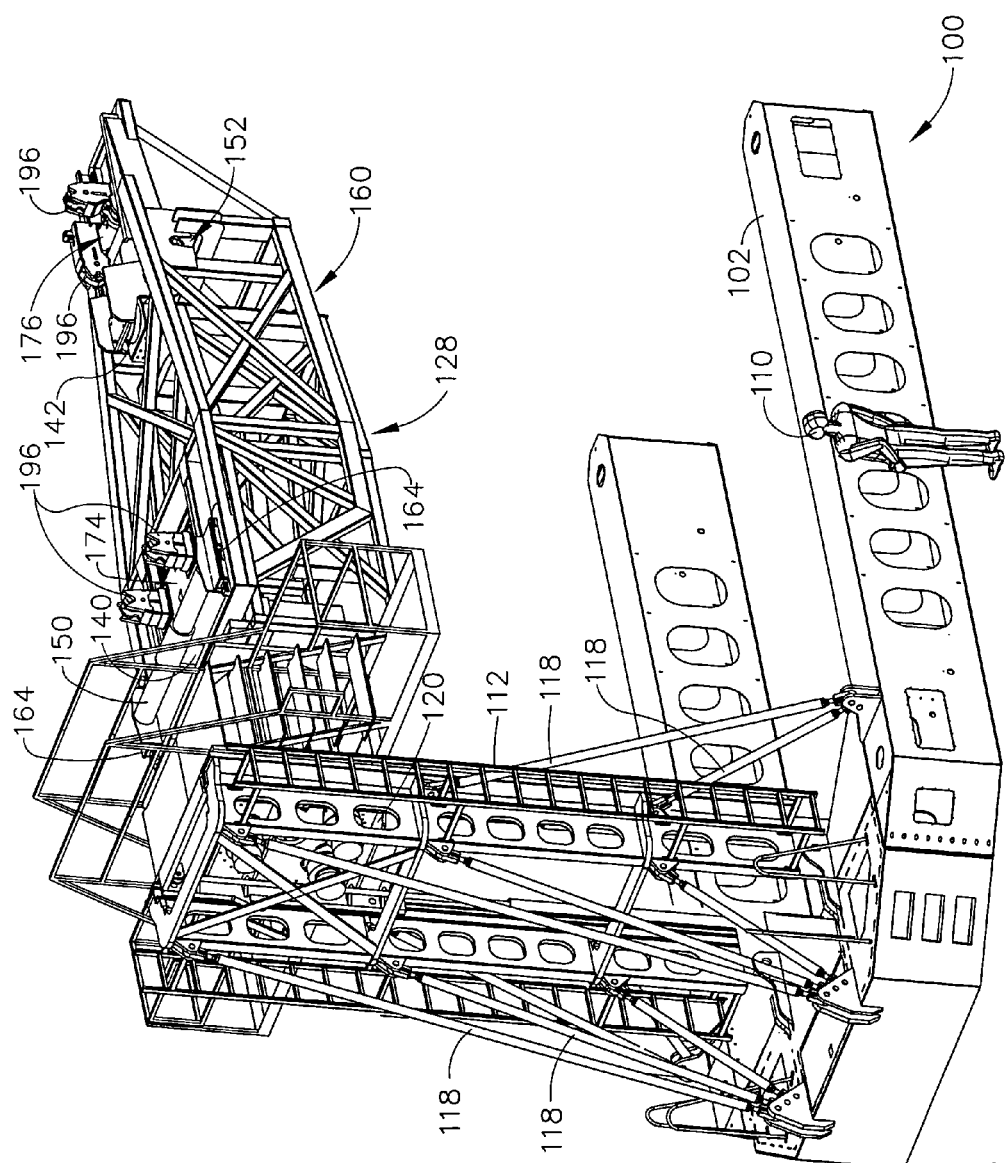
FIG. 2 is a perspective view from a different angle of the material handling system shown in FIG. 1.

Referring now to the figures, FIG. 1 illustrates a material handling system incorporating mandrel segment loader 100 according to one embodiment. Mandrel segment loader 100 may include chassis 102 that supports the remainder of mandrel segment loader 100 and provides for movement of loader 100, for example, over a shop or factory floor. Chassis 102 may be provided with wheel units and a control system (not shown)—such as those manufactured by MaxMove AB of Bjurholm, Sweden—that provide translation in the direction of X-axis 104 and in the direction of Y-axis 106, which may be horizontal, in any combination simultaneously so that chassis 102 can, for example, crab sideways or move at any angle relative to X-axis 104 and Y-axis 106. More generally, chassis 102 can move across a floor in any direction chosen by an operator, including up a 2.5% maximum grade or down a grade and can perform a C'-axis 108 rotation (rotation about an axis that is perpendicular to both X-axis 104 and Y-axis 106) centered at any chosen point, for example, on the floor supporting chassis 102. Chassis 102 may have an overall length of approximately 34 feet and overall width of approximately 17 feet, and mandrel segment loader 100 may have on overall height of approximately 22 feet with a maximum height of about 28 feet when positioned as seen in FIG. 2. Mandrel segment loader 100 may, for example, be capable of positioning a maximum load of 10,000 pounds with the degree of accuracy described. Human figures 110 shown in FIGS. 1 and 2 provide an indication of the relative size of mandrel segment loader 100 for transporting a mandrel segment.

Figure 2B:
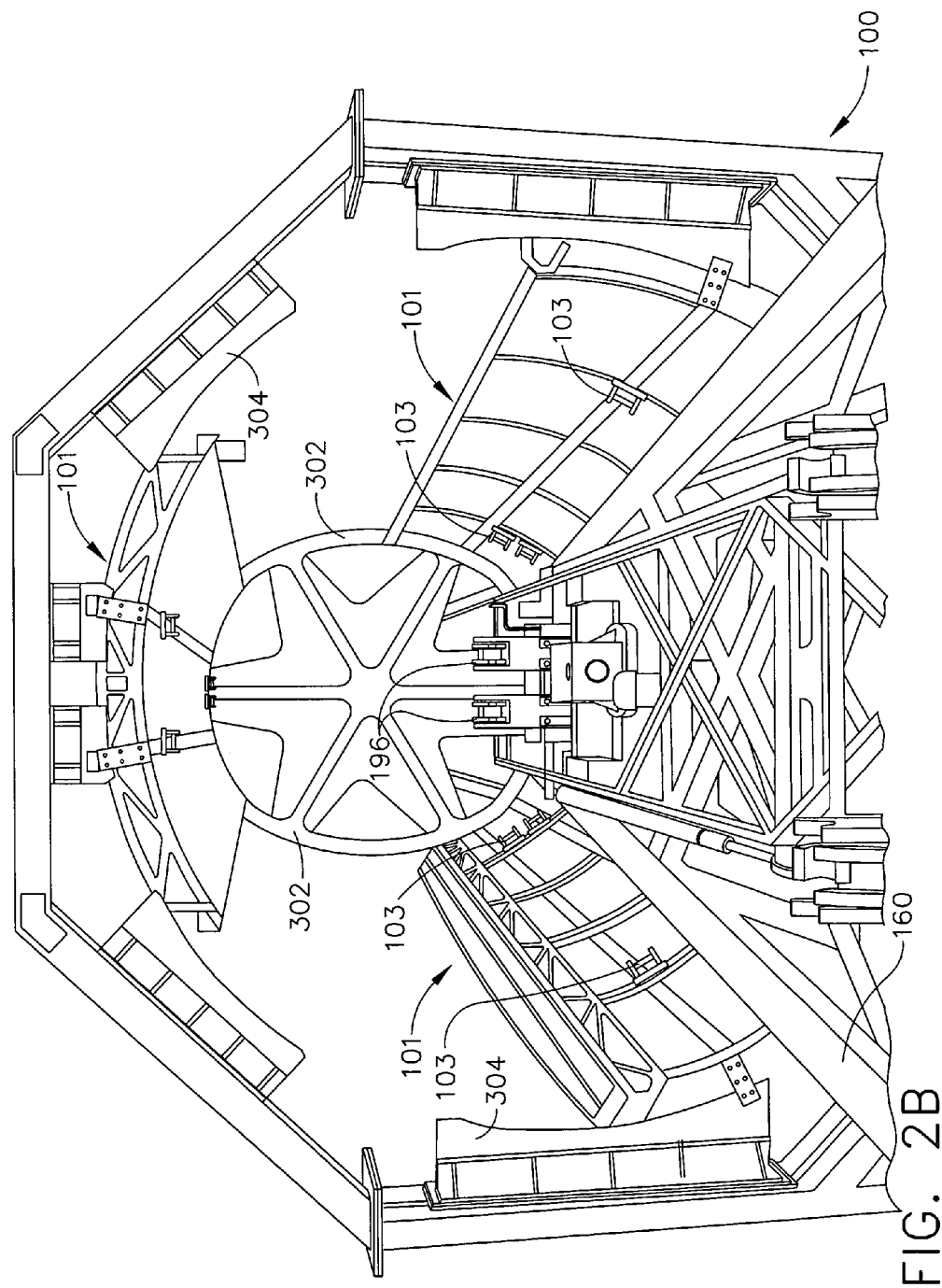
FIG. 2B is a perspective view of a mandrel segment loader inserted between three mandrel segments attached between rings of a fixed ring assembly and disassembly station (FRADS) according to one embodiment of the present invention.

FIG. 2A shows a mandrel segment loader 100 with arm 128 rotated about A-axis 130 and holding a mandrel segment 101 in position between rings 302 and 304 of a fixed ring assembly and disassembly station (FRADS) 300. FIG. 2A also shows the position of chassis 102 relative to rings 302 and 304 when positioning a mandrel segment. The $Z_1$-actuator 140 and $Z_2$-actuator 142, rotated about A-axis 130, may also be more clearly seen in this figure. FIG. 2B shows a mandrel segment loader arm and bridge 160 in position between three mandrel segments 101 after the mandrel segments 101 have been positioned by mandrel segment loader 100 and affixed to rings 302 and 304, for example, by bolts. Grippers 196 may be seen at the front of bridge 160 as well as a number of the bars 103 attached to mandrel segments 101 and used by mandrel segment loader 100 to grip each mandrel segment 101 using grippers 196.

Figure 3:
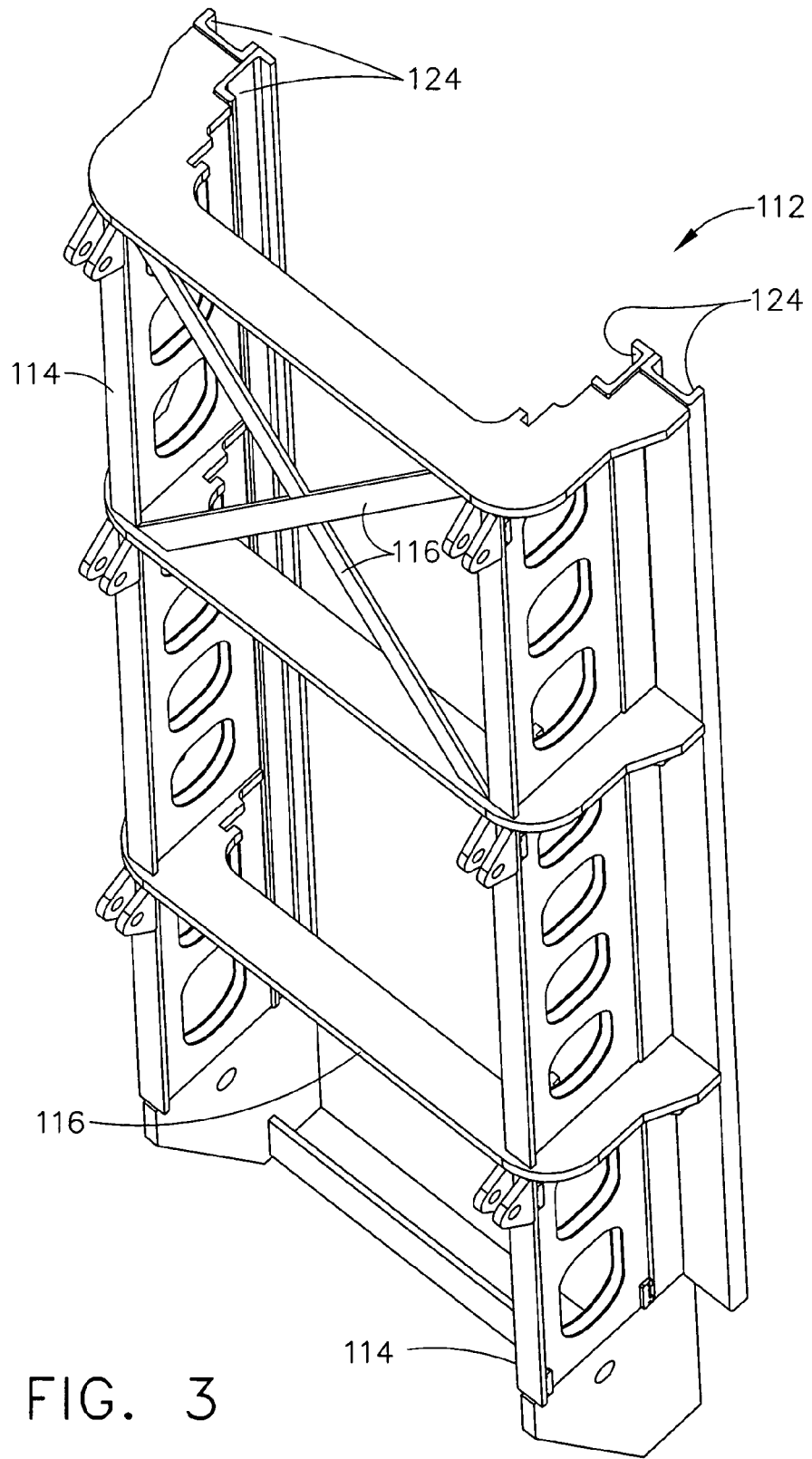
FIG. 3 is a perspective view of a mast of the material handling system shown in FIG. 1.
Figure 4:
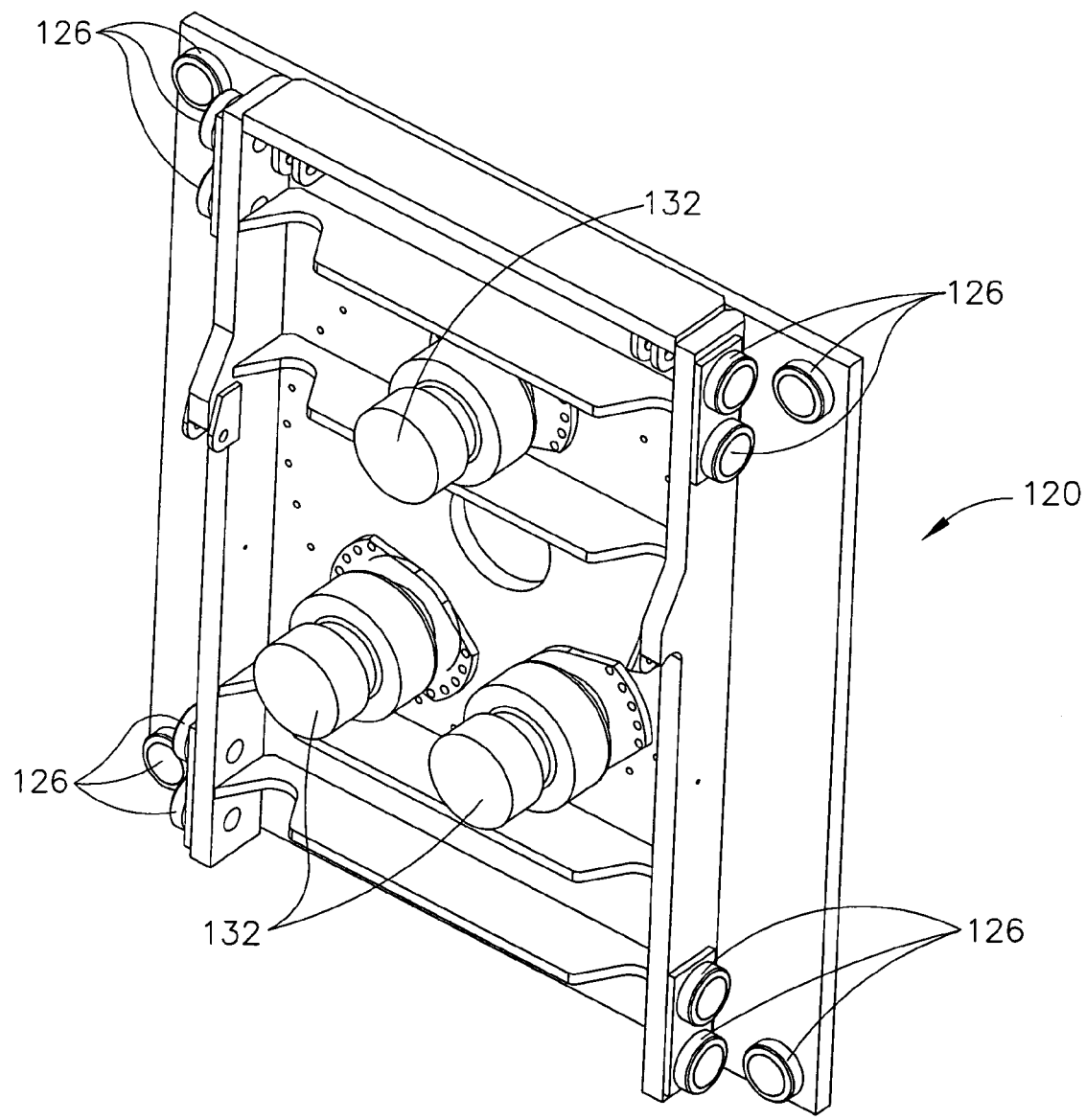
FIG. 4 is a perspective view of a lift truck carriage assembly of the material handling system shown in FIG. 1.

Mandrel segment loader 100 may include a mast 112, as shown in FIGS. 1 and 2 and more clearly seen in FIG. 3. Mast 112 may have nested, interlocking I-beam sections 114 made of rolled carbon steel with cross bracing 116 to guarantee maximum strength, rigidity and stability with a full load at maximum height, to prevent breakage and distortion due to bending. Mast 112 may be attached to chassis 102 and may be further supported by guys 118. Lift truck carriage 120, shown in FIGS. 1 and 2 and more clearly seen in FIG. 4, may be carried by mast 112 so that lift truck carriage 120 can slide vertically up and down along mast 112, providing translation in the direction of W-axis 122 (see FIG. 1) of a load—such as a mandrel segment or passenger floor—gripped by mandrel segment loader 100. For example, lift truck carriage 120 may be mounted to mast tracks 124 of mast 112 via load roller bearings and lateral thrust rollers 126. Load roller bearings and lateral thrust rollers 126 may be permanently lubricated and mounted on trunnions to reduce maintenance and friction. Lateral thrust rollers 126 with shim or bolt roller adjustment may be used to compensate for off-center loading between lift truck carriage 120 and mast 112. W-axis 122 lift (e.g. for sliding lift truck carriage 120 along mast 112) may be hydraulically actuated, for example, or may be provided by a ball screw mechanism. The W axis 122 lift of lift truck carriage 120 along mast 112 may be provided at a rate of 0.0 to 2.0 inches per second, with a positioning accuracy of 0.20 inch.

Figure 5:
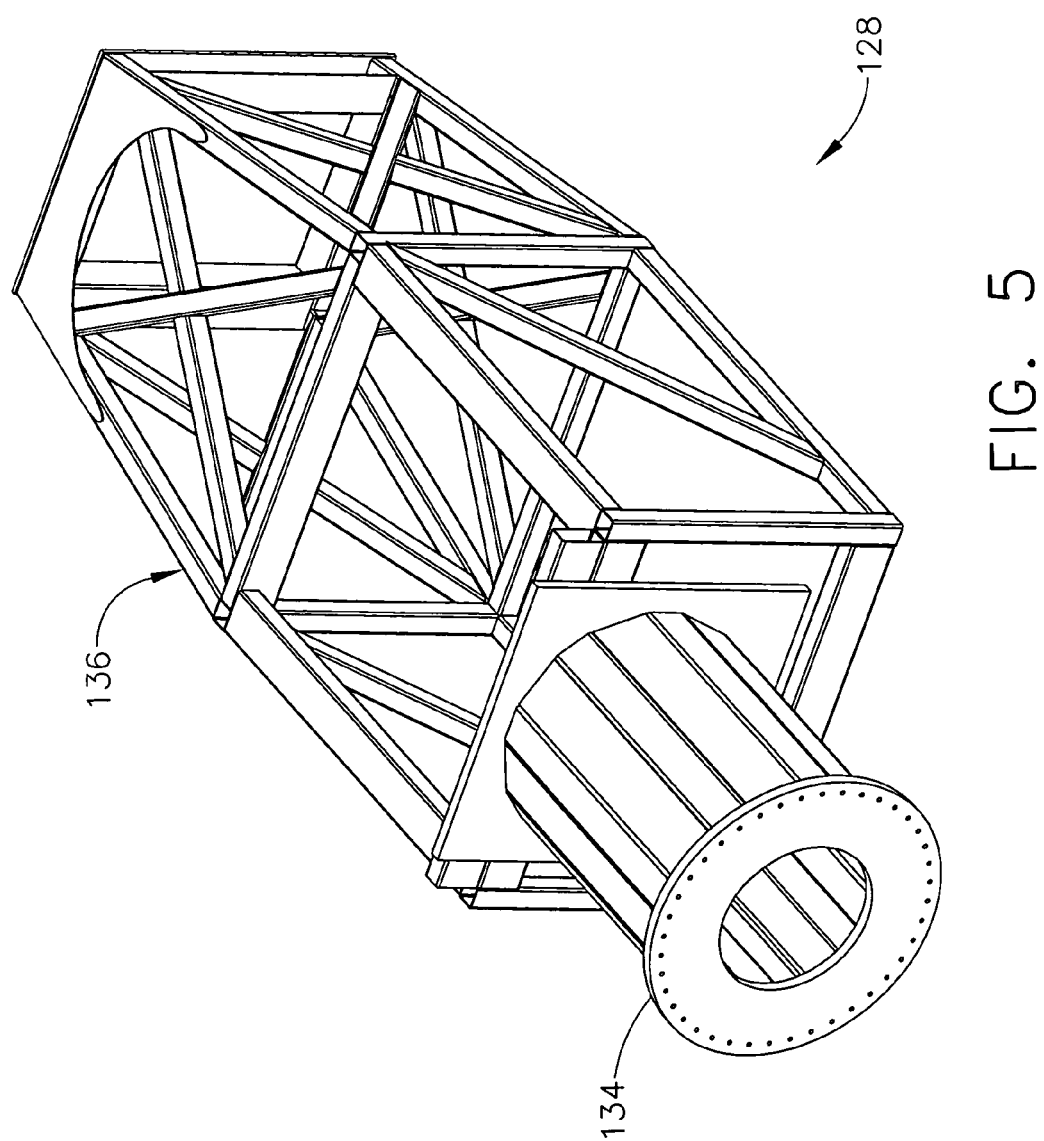
FIG. 5 is a perspective view of an arm of the material handling system shown in FIG. 1.

Arm 128, shown in FIGS. 1 and 2 and more clearly seen in FIG. 5, may be mounted on lift truck carriage 120 so that arm 128 may provide a rotation about A-axis 130 (see FIG. 1) of a load—such as a mandrel segment or passenger floor—gripped by mandrel segment loader 100. A-axis 130, for example, may be horizontal and perpendicular to W-axis 122, which may be vertical. Mechanical power for rotating arm 128—and a gripped load such as a mandrel segment or passenger floor—about A-axis 130 may be provided by electric motors 132 mounted on lift truck carriage 120. Motors 132, as well as any other motors used for mandrel segment loader 100, should have sufficient horsepower and torque to insure smooth operation of the material handling system, e.g., mandrel segment loader 100, under all normal conditions. Drive motors and lift motors should be separate. An A-axis 130 rotation may rotate a load from 0 degrees to +/−190 degrees and may position the load within +/−0.5 degree. The ability to turn more than halfway around may provide positioning flexibility, for example, in the range of +170 to +190 degrees without having to rotate a load through 360 degrees to pick up all parts of that range. A-axis rotation speeds may be from 0 to 3 degrees per second. As shown in FIG. 5, arm 128 may include a mounting interface 134 allowing lift truck carriage 120 to support and rotate arm 128 along with a gripped load and all system components carried by arm 128. Arm 128 may include a truss structure 136 designed to support the arm 128, gripped load, and system components at any angle of rotation about A-axis 130.

Figure 6:
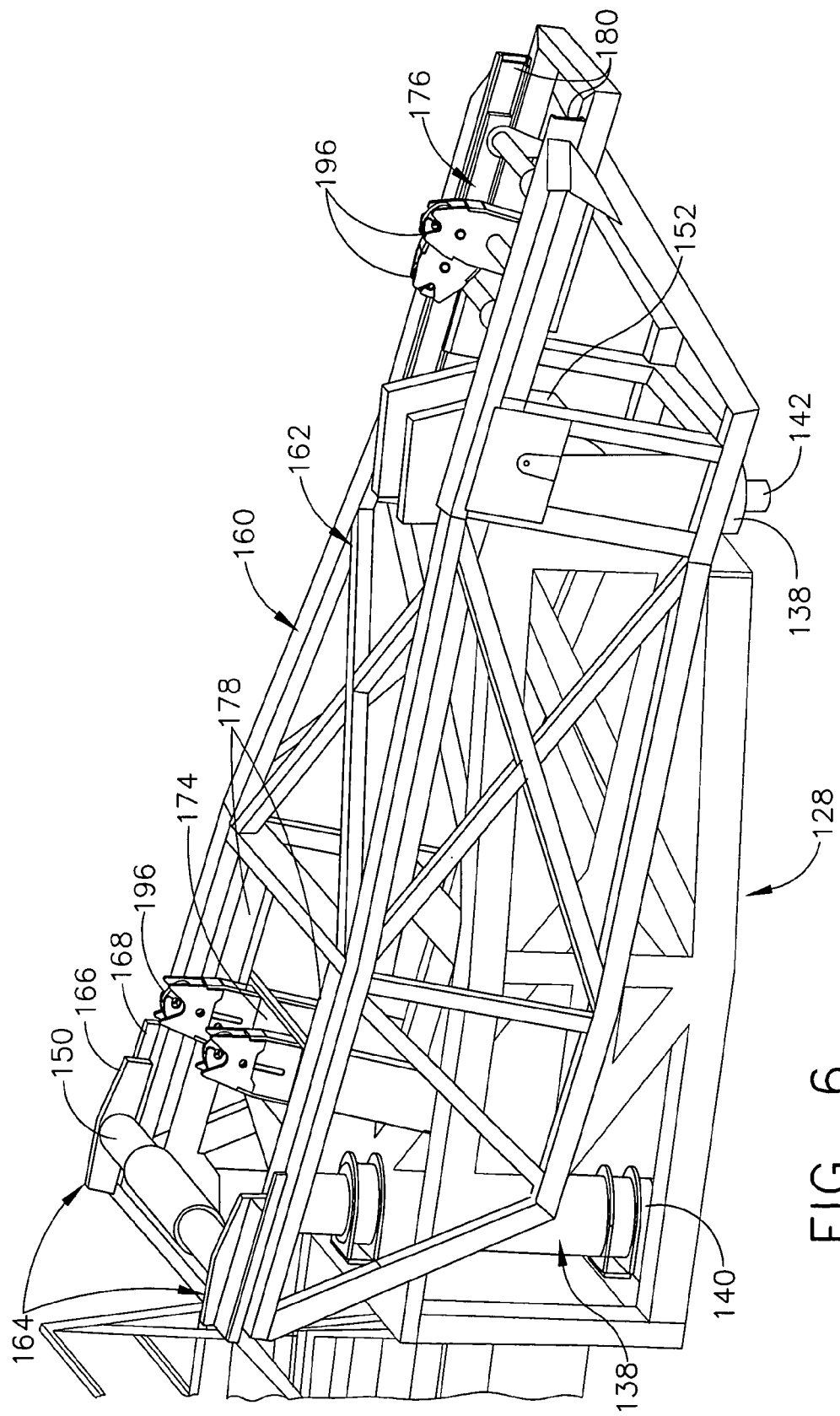
FIG. 6 is a perspective view of a bridge and arm assembly of the material handling system shown in FIG. 1.
Figure 7:
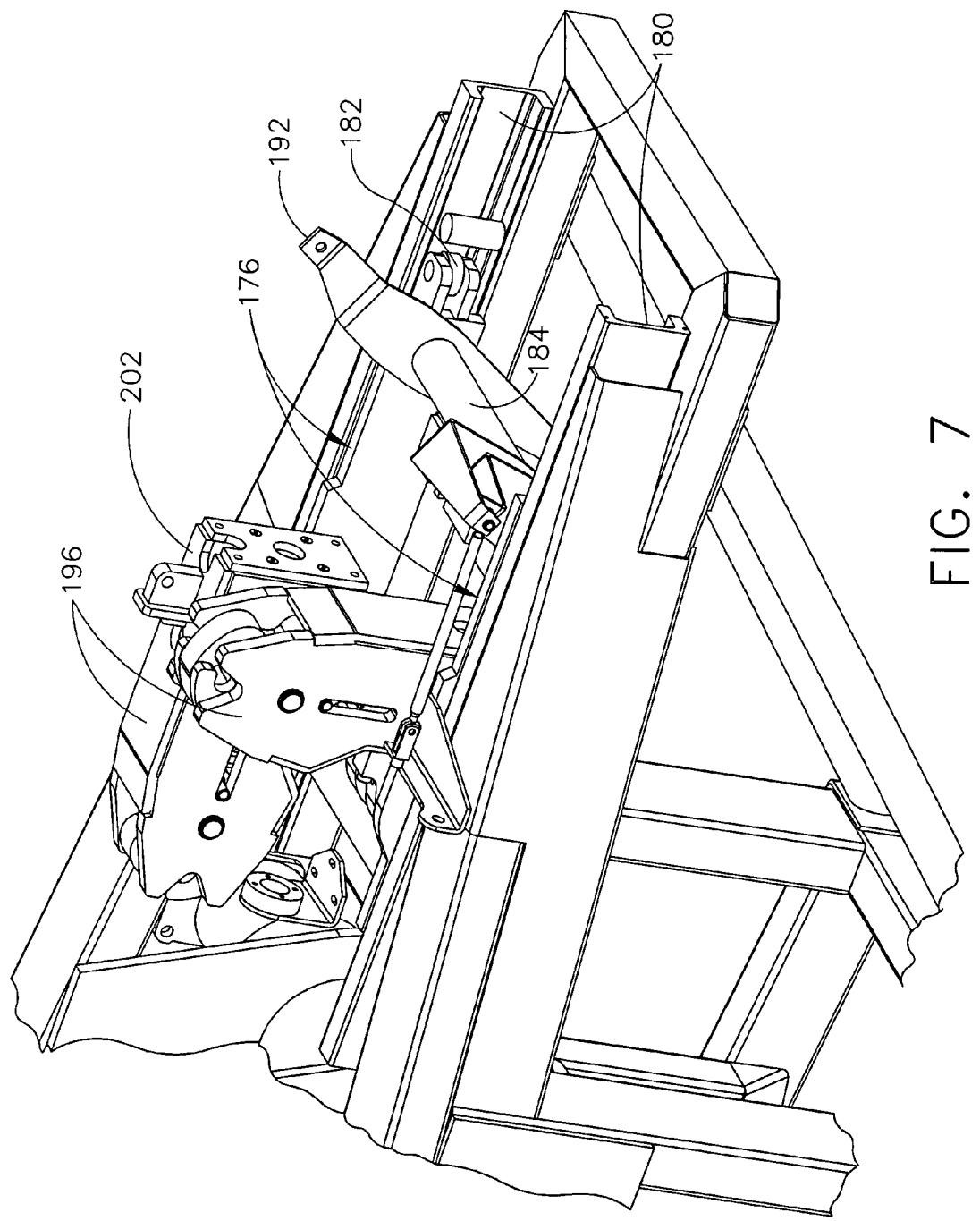
FIG. 7 is a front perspective view of the fore part of the bridge, showing front grippers, of the material handling system shown in FIG. 1.
Figure 8:
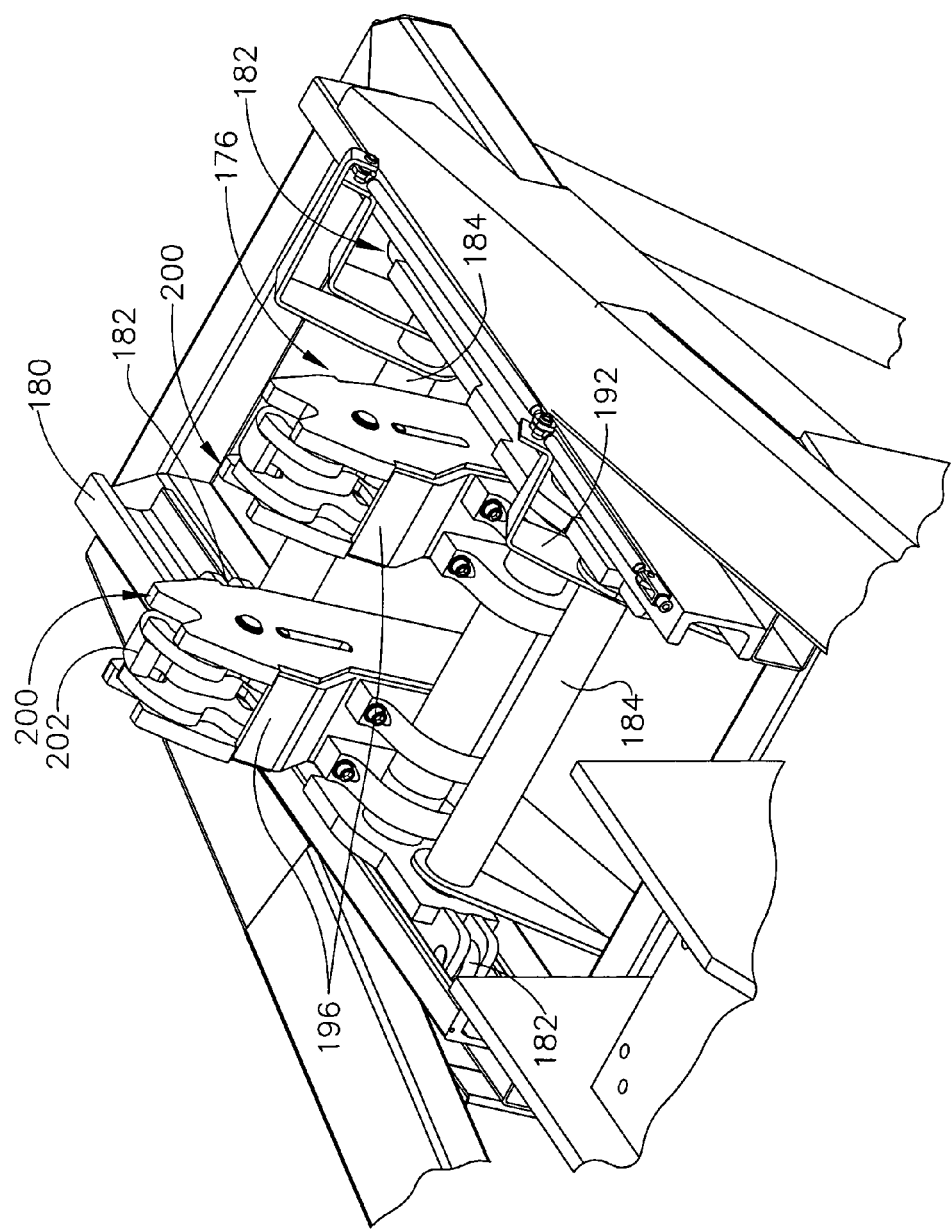
FIG. 8 is a rear perspective view of the fore part of the bridge of the material handling system shown in FIG. 1.
Figure 9:
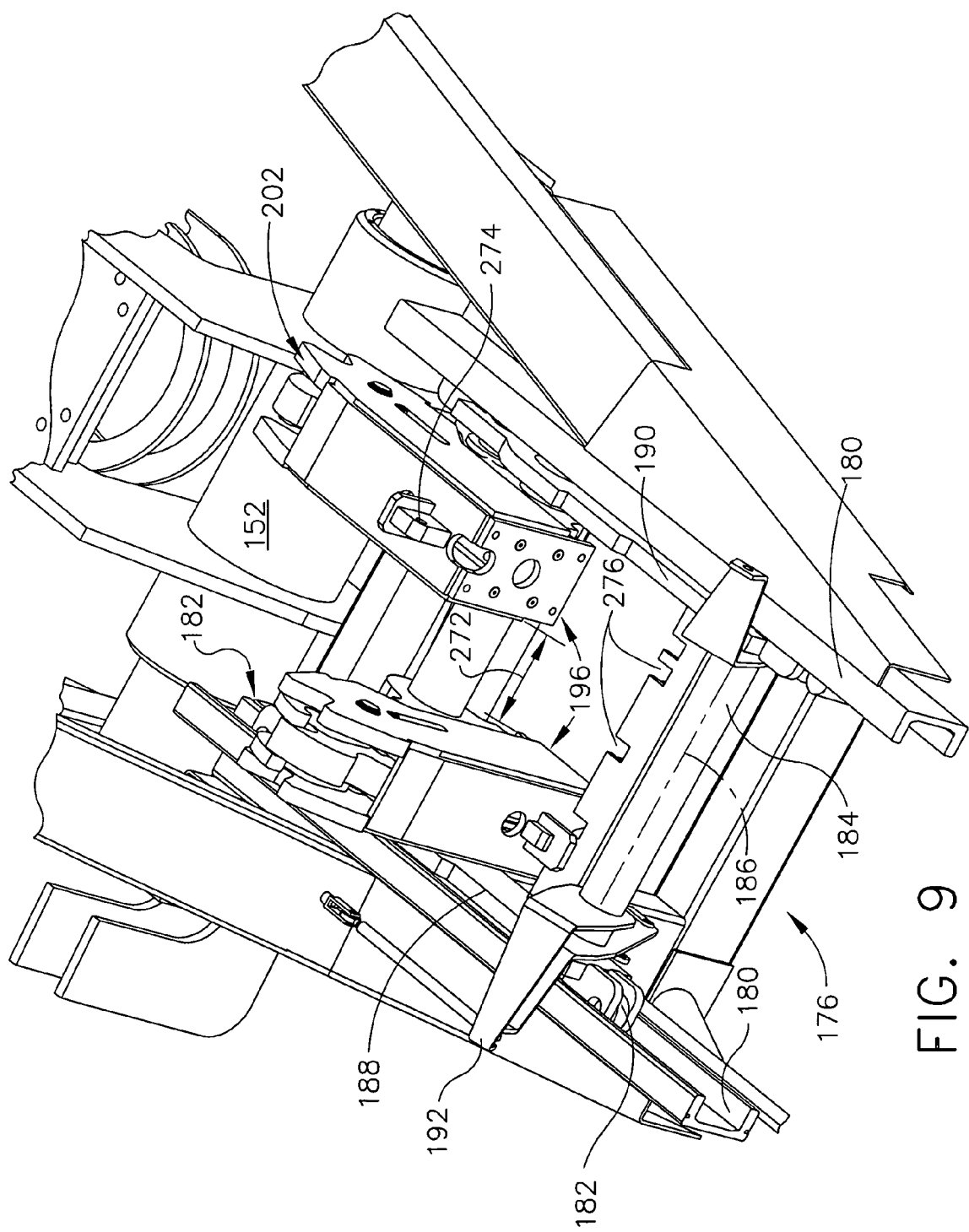
FIG. 9 is a top perspective view of the fore part of the bridge of the material handling system shown in FIG. 1.
Figure 10:
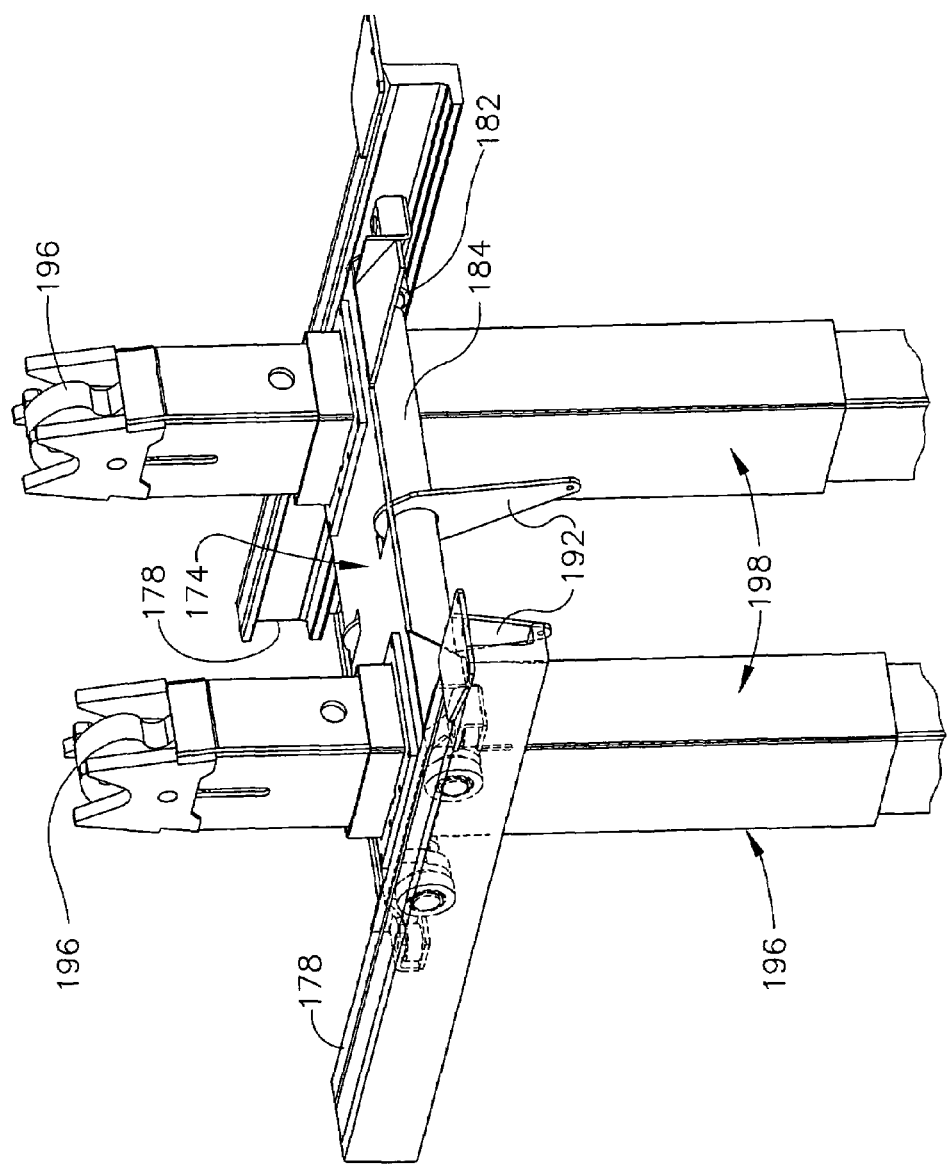
FIG. 10 is a perspective view of a portion of the bridge assembly, showing rear grippers, of the material handling system shown in FIG. 1.

As shown in FIG. 6, actuators 138 are attached to arm 128. Actuators 138 may include a $Z_1$-actuator 140 and a $Z_2$-actuator 142. The $Z_1$-actuator 140 may provide translation relative to arm 128 of a load gripped by mandrel segment loader 100 in the direction of the $Z_1$-axis 144 (see FIG. 1). The $Z_2$-actuator 142 may provide translation relative to arm 128 of a load in the direction of the $Z_2$-axis 146 (see FIG. 1). Actuators 138 may be electrically or hydraulically actuated and may be moved and positioned independently of one another. A control system (not shown) may be provided so that motion in the direction of the $Z_1$-axis 144 can be coordinated with motion in the direction of the $Z_2$-axis 146. For example, if like motion is provided along both $Z_1$-axis 144 and $Z_2$-axis 146, an overall Z-translation relative to arm 128 may be provided to a load, and if a differential motion is provided between $Z_1$-axis 144 and $Z_2$-axis 146, a rotation (in the plane of $Z_1$-axis 144 and $Z_2$-axis 146) about a B-axis 148 may be provided to a load, where the location of the B-axis 148, i.e., the center of rotation, is determined by the relative motion along $Z_1$-axis 144 and $Z_2$-axis 146. Thus, B-axis 148 may be a virtual axis (perpendicular to the $Z_1$-axis 144 and the $Z_2$-axis 146) that rotates using coordinated motion of the Z axes, $Z_1$-axis 144 and $Z_2$-axis 146. The center of B-axis 148 rotation may be selectable by an operator using the control system, and the center of B-axis 148 rotation may be located, for example, at each end of each mandrel segment.

Continuing with FIG. 6, $Z_1$-actuator 140 may carry a $Y_1$-actuator 150 attached to $Z_1$-actuator 140 perpendicularly to the $Z_1$-axis 144 of $Z_1$-actuator 140. Similarly, $Z_2$-actuator 142 may carry a $Y_2$-actuator 152 attached to $Z_2$-actuator 142 perpendicularly to the $Z_2$-axis 146 of $Z_2$-actuator 142. $Y_1$-actuator 150 may provide translation relative to arm 128 of a load gripped by mandrel segment loader 100 in the direction of the $Y_1$-axis 154 (see FIG. 1). $Y_2$-actuator 152 may provide translation relative to arm 128 of a load in the direction of the $Y_2$-axis 156 (see FIG. 1). Actuators 150, 152, like actuators 138, may be electrically or hydraulically actuated and may be moved and positioned independently of one another. The control system may be operated so that motion in the direction of $Y_1$-axis 154 can be coordinated with motion in the direction of $Y_2$-axis 156. For example, if like motion is provided along both the $Y_1$-axis 154 and the $Y_2$-axis 156, an overall Y-translation relative to arm 128 may be provided to a load, and if a differential motion is provided between the $Y_1$-axis 154 and the $Y_2$-axis 156, a rotation (in the plane of the $Y_1$-axis 154 and the $Y_2$-axis 156) about a C-axis 158 may be provided to a load, where the location of the C-axis 158, i.e., the center of rotation, is determined by the relative motion along the $Y_1$-axis 154 and the $Y_2$-axis 156. Thus, the C-axis 158 may be a virtual axis (perpendicular to the $Y_1$-axis 154 and the $Y_2$-axis 156) that rotates using coordinated motion of the Y axes, $Y_1$-axis 154 and $Y_2$-axis 156. Because the C-axis 158 is a virtual axis, the position of C-axis 158, i.e., center of rotation about C-axis 158, may be selectable by an operator using the control system, and the center of rotation about C-axis 158 may be located, for example, so that each mandrel segment can be rotated around each end of the mandrel segment and the center of the mandrel segment.

The $Y_1$-actuator 150 and the $Y_2$-actuator 152 may carry a bridge 160 attached to the $Y_1$-actuator 150 and the $Y_2$-actuator 152. Bridge 160 may include a truss structure 162 designed to support—at any angle of rotation about A-axis 130—the bridge 160 as well as a gripped load such as a mandrel segment or passenger floor and all other system components carried by bridge 160. Because the $Z_1$-actuator 140 and the $Z_2$-actuator 142 may be moved and positioned independently of one another, the distance between the $Y_1$-actuator 150 and the $Y_2$-actuator 152 (e.g., between the $Y_1$-axis 154 and the $Y_2$-axis 156) may change. Therefore, at least one of the actuators 150 and 152 may be attached to bridge 160 via a length adjustment mechanism 164 that compensates for changes in distance between the $Y_1$-axis 154 and the $Y_2$-axis 156 or between the $Y_1$-actuator 150 and the $Y_2$-actuator 152. For example, the $Y_1$-actuator 150 may be attached to a guide 166 that rides along a rail 168 attached to bridge 160.

A load—such as a mandrel segment or passenger floor—may be translated in the direction of $X_1$-axis 170 and $X_2$-axis 172, which may be collinear with $X_1$-axis 170 or parallel to $X_1$-axis 170. In the example used here to illustrate one embodiment, the axes are collinear, i.e., identical, and translation may be described with respect to $X_1$-axis 170 only. In alternative embodiments, the two axes could be parallel and translations could be performed independently with respect to each axis. Translation of a load in the direction of $X_1$-axis 170 relative to bridge 160 may be achieved by moving cars 174 and 176 (see FIGS. 6 through 10) along guide tracks 178 and 180, respectively, that are attached to bridge 160. Cars 174 and 176 ride on rollers that run within guide tracks 178 and 180 and may be moved independently in an alternative embodiment. In the example used here to illustrate one embodiment, cars 174 and 176 may be linked together to move in unison to keep cars 174 and 176 (and grippers 196) at the same relative distance from each other, which effectively combines $X_1$-axis 170 and $X_2$-axis 172 into a single $X_1$-axis 170.

Each of the $X_i$, $Y_i$, and $Z_i$ axes (i=1,2) may be implemented using servo-controlled positioning with travel speeds in the range of 0 through 24 inches per minute and may have a positioning resolution in the range of 0.002 to 0.005 inch. Total $X_i$-axis travel may be approximately 8.0 inches, for example, total $Y_i$-axis travel may be in the range of approximately +/−8.0 inches, and total $Z_i$-axis travel may be approximately 25.0 inches.

Cars 174 and 176 may be supported by rollers on guide tracks 178 and 180 in such a way that a rotation may be provided about A'-axis 194 (see FIG. 1) relative to bridge 160 of a load—such as a mandrel segment or passenger floor—gripped by mandrel segment loader 100. The rollers may be lateral guide rollers, such as rollers 182, or load rollers that provide cars 174 and 176 support within the guide tracks 178 and 180 in a direction perpendicular to that of rollers 182. Either type of rollers may be set on control shafts 184 on eccentrics to the longitudinal rotational axis 186 (see FIG. 9) of the shaft 184. Load rollers supporting a car 174 (or 176) may be mounted on differential eccentrics as from one side 188 of the car 174 (or 176) to the opposite side 190 of the car 174 (or 176) (see, e.g., FIG. 9). Thus, coordinated rotation of control shafts 184 about their longitudinal rotational axes 186 using, for example, control levers 192 can be used to achieve a limited amount of rotation of the cars 174 and 176 relative to bridge 160 as, for example, the eccentrics on one side 188 lower the car 174 (or 176) on that side with respect to guide tracks 178 (or 180) and the eccentrics on the opposite side 190 raise the car 174 (or 176) on that side with respect to guide tracks 178 (or 180). By rotating both cars 174 and 176 in unison, rotation of a load may be provided about A'-axis 194 relative to bridge 160. An A'-axis 194 rotation may rotate a load in the range of +/−1 degree and may have a positioning resolution in the range of 0.005 to 0.01 degree. An A'-axis 194 rotation may be considered as "fine-tuning" an A-axis 130 rotation, however, an A'-axis 194 rotation rotates a gripped load relative to bridge 160 (A'-axis 194 remains parallel to $X_1$-axis 170 and $X_2$-axis 172) while an A-axis 130 rotation rotates a gripped load relative to arm 128 (A'-axis 194 may not remain parallel to A-axis 130 depending on motions of $Z_1$-axis 144, $Z_2$-axis 146, $Y_1$-axis 154, and $Y_2$-axis 156).

Interface of mandrel segment loader 100 to a load—such as a mandrel segment or passenger floor—may be provided by grippers 196. For example, a pair of rear grippers 198 (see FIG. 10) are attached to and move with rear car 174. Front grippers 200 (see FIG. 8) attached to front car 176 move so that grippers 196 (e.g., pairs of grippers 198 and 200) may be positioned with respect to any combination of axes described above. Each gripper 196 may grip a bar on the mandrel segment or other load to be moved and positioned by the material handling system exemplified by mandrel segment loader 100. Grippers 196 may be operated, for example, electrically or pneumatically. Sensors—such as a limit switch or proximity switch—may be provided that indicate to the operator that a load such as a mandrel segment is being held securely by mandrel segment loader 100.

To provide greater flexibility, for example, in the variety of loads capable of being handled by mandrel segment loader 100, one or more of the grippers 196 may be "foldable" so that it can be moved out of the way into a folded position when not being used to grip a load. Gripper 202, for example, is shown in a folded position in FIGS. 7 and 9 and is shown in an engaging position in FIG. 8. Foldable gripper 202 moves in transverse direction 272 (see FIG. 9) to provide additional flexibility in positioning and configuration of grippers 196. Tab 274 on foldable gripper 202 may engage a notch 276, of which a multiple number may be provided, in order, for example, to provide repeatable accurate positioning and secure positioning when foldable gripper 202 is placed in the engaging position.

Figure 11A:
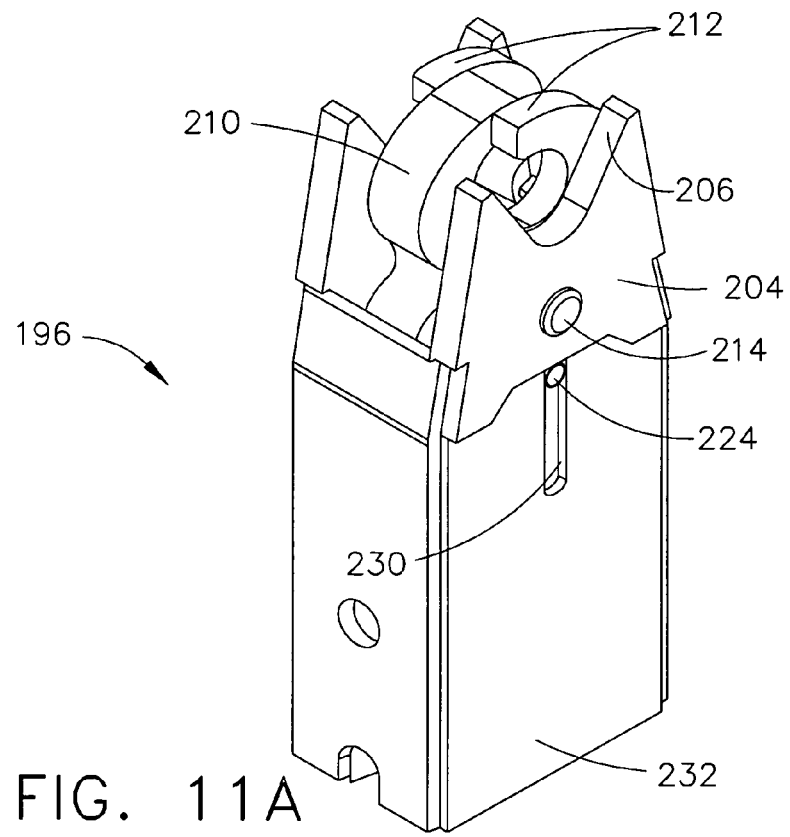
FIG. 11A is a perspective view of a gripper of the material handling system shown in FIG. 1.
Figure 11B:
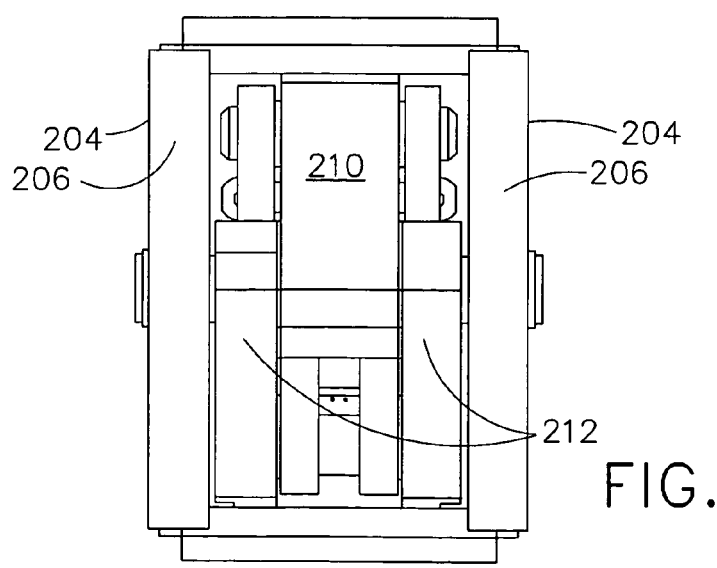
FIG. 11B is a top view of a gripper of the material handling system shown in FIG. 1.
Figure 11C:
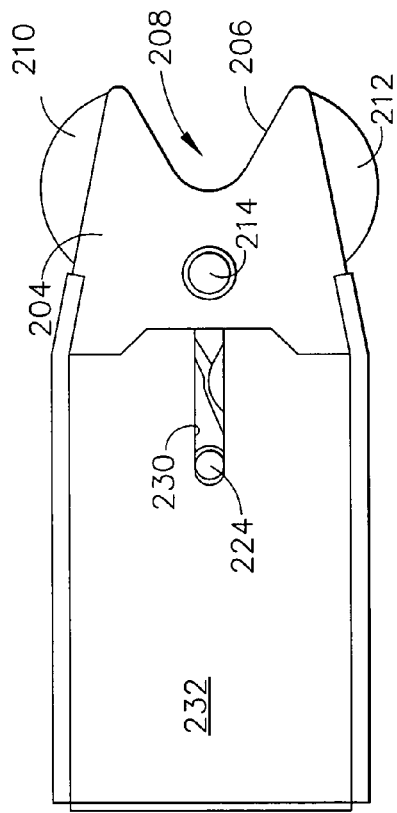
FIG. 11C is a side view of a gripper of the material handling system shown in FIG. 1.
Figure 11D:
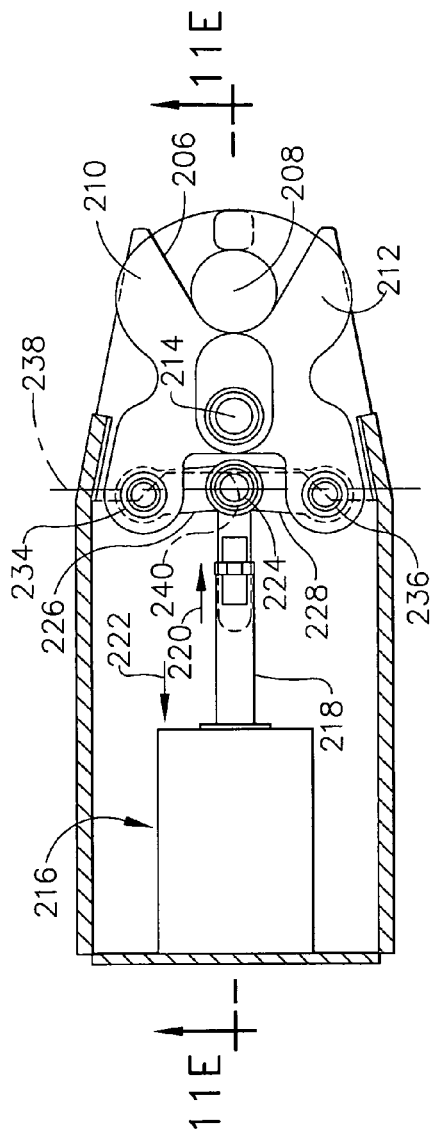
FIG. 11D is a cut away view of a gripper of the material handling system shown in FIG. 1.
Figure 11E:
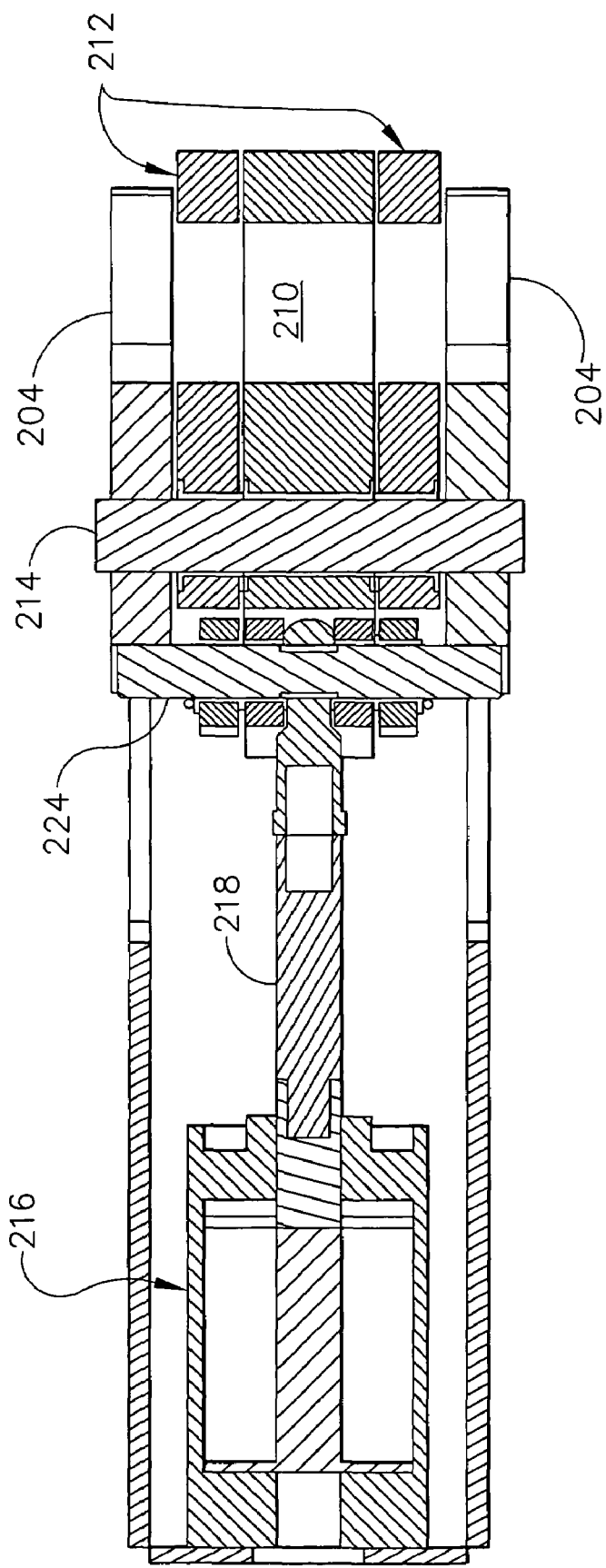
FIG. 11E is a cross sectional view taken generally along line 11E-11E of FIG. 11D.

FIGS. 11A through 11E show additional details for a gripper 196. Gripper 196 includes side guide plates 204 having a v-shaped notch that forms a gripping guide 206 that may guide a bar attached to a load into a gripping position 208 suitable for being held securely by gripper 196. Gripper 196 includes a thumb 210 and fingers 212 which may be opposable to each other and rotatable about main pivot 214 supported by side guide plates 204 so that thumb 210 and fingers 212 may open (as shown in FIG. 11C) to release or accept a load and may close (as shown in FIGS. 11A and 11D) to grip a load. Thumb 210 and fingers 212 may be actuated (electrically or pneumatically, for example) using actuator 216 to move actuator rod 218 in the direction indicated by arrow 220 to close thumb 210 and fingers 212 and in the direction indicated by arrow 222 to open. Actuator rod 218 may be connected via actuator pivot 224 to thumb control link 226 and fingers control link 228. Actuator pivot 224 may be guided by guide slots 230 in side plates 232. Thumb control link 226 and fingers control link 228 may be connected in turn, respectively, via thumb pivot 234 and fingers pivot 236 to thumb 210 and fingers 212. Thus, movement and force may be transmitted from actuator rod 218 to thumb 210 and fingers 212. When in the closed position, as shown in FIG. 11D, the center of actuator pivot 224 may be off line in the direction of arrow 220 from a line 238 passing through the centers of thumb pivot 234 and fingers pivot 236. Any counter force tending to open thumb 210 and fingers 212 from the vicinity of gripping position 208 applies a compressive moment to thumb pivot 234 and fingers pivot 236. The counter force tends to push actuator pivot 224 (and actuator rod 218) further in direction of arrow 220, which is the direction for actuator rod 218 to close thumb 210 and fingers 212, and firmly presses actuator pivot 224 against the ends 240 of guide slots 230. Thus, grippers 196 in this embodiment have a self-closing or self-locking property. Once a bar attached to a load is engaged by a gripper 196, the load may be released only by movement of actuator rod 218 in direction of arrow 222, which is the direction for actuator rod 218 to open thumb 210 and fingers 212, and not by a counter force from the gripping position 208 forcing open thumb 210 and fingers 212.

FIGS. 12A and 12B show additional details for a ball screw actuator 242 according to one embodiment, which may be used, for example, to implement Z1-actuator 140, Z2-actuator 142, Y1-actuator 150, or Y2-actuator 152. Outer sleeve 244, which is cylindrical, has a circular cross sectional bore to receive telescoping inner sleeve 246 and to allow rotation. The sleeves are sized to support the anticipated loads and bending moments which may occur throughout the range of motion at any non-zero angle relative to the longitudinal axis 247 when a load is moved. Outer sleeve 244 has attachment fixtures 248 for attaching other components, such as arm 128, bridge 160, or actuators 140, 142, 150, or 152. Likewise, inner sleeve 246 may have attachment fixtures 250 in addition to those on the outer sleeve or instead.

Ball screw actuator 242 includes bearings 252 and 254 in the form of rings disposed between sleeves 244 and 246 to facilitate the relative sliding motion during telescoping, as is common with a hydraulic cylinder. As shown in FIG. 12B, for example, bearing 254 is fixed to inner sleeve 246 and bearing 252 is fixed to outer sleeve 244. Bearing 254 moves with sleeve 246 over the surface of sleeve 244 while bearing 252 moves with sleeve 244. The bearings 252 and 254 may be made from ultra high molecular weight (UHMW) plastic to provide coefficients of friction for low wear and the load bearing strength to support the required loads and bending moments that may occur at any angle. Ball screw actuator 242 may include a ball screw mechanism 256. Ball screw mechanism 256 may be implemented, for example, using a ball screw 257 driven by an electric or pneumatic motor 258 through a gear box 260 so that ball screw 257 pushes or pulls drive sleeve 262, which is fixed relative to inner sleeve 246, producing telescoping in or out of inner sleeve 246 relative to outer sleeve 244.

The foregoing description relates to exemplary embodiments of the invention. Modifications may be made without departing from the spirit and scope of the invention as set forth in the following claims.

We claim:

1. A material handling system comprising:
   an arm that rotates about an A-axis, the arm having a $Z_1$-axis in fixed relation to the arm and perpendicular to the A-axis, and having a $Z_2$-axis in fixed relation to the arm and parallel to the $Z_1$-axis so that the $Z_1$-axis and $Z_2$-axis rotate together about the A-axis;
   a bridge carried by the arm, the bridge having a $Y_1$-axis maintained perpendicular to the $Z_1$-axis and a $Y_2$-axis maintained perpendicular to the $Z_2$-axis, the bridge also having an $X_1$-axis maintained perpendicular to the $Y_2$-axis, wherein the bridge translates relative to the arm along the $Z_1$-axis and $Z_2$-axis independently and the bridge translates relative to the arm along the $Y_1$-axis and $Y_2$-axis independently;
   a first gripper and a second gripper for gripping the material, wherein the first gripper and second gripper are carried by the bridge and translate along the $X_1$-axis, and wherein:
      the first gripper and the second gripper are configured to translate along the $Z_1$-axis and $Z_2$-axis differentially to produce rotation of the material about a virtual B-axis perpendicular to the $Z_1$-axis and $Z_2$-axis; and
      the first gripper and the second gripper are translated along the $Y_1$-axis and $Y_2$-axis differentially to produce rotation of the material about a virtual C-axis perpendicular to the $Y_1$-axis and $Y_2$-axis.

2. The material handling system of claim 1 farther comprising:
   a mast having a W-axis that is maintained perpendicular to a floor; and
   a lift truck carriage carried by the mast, wherein the lift truck carriage supports the arm, provides rotation of the arm about the A-axis, and translates along the W-axis to move the arm and grippers perpendicularly to the floor.

3. The material handling system of claim 1 farther comprising:
   a car mounted to the bridge so that the car translates relative to the bridge along the $X_1$-axis wherein:
   the car rotates about an A'-axis parallel to the $X_1$-axis; and
   at least one of the first gripper and the second gripper is carried by the car.

4. The material handling system of claim 1 farther comprising:
   a chassis that carries the arm and has an X-axis and a Y-axis parallel to a floor wherein:
   the chassis is configured to translate in the direction of the X-axis and in the direction of the Y-axis in combination simultaneously so that movement is provided across the floor in any chosen direction.

5. The material handling system of claim 1 farther comprising:
   a chassis that carries the arm and has an X-axis and a Y-axis parallel to a floor wherein:
   the chassis translates in the direction of the X-axis and in the direction of the Y-axis in combination simultaneously so that rotation of the material relative to the floor is provided about a C'-axis that is perpendicular to both the X-axis and the Y-axis.

6. The material handling system of claim 1 wherein:
at least one of the first gripper and the second gripper is a self-locking gripper that includes an actuator pivot that pushes against the end of a guide slot in response to a force tending to open the self-locking gripper.

7. The material handling system of claim 1 further comprising:
a $Z_1$-actuator attached to the arm and that provides translation of the first gripper in the direction of the $Z_1$-axis; and
a $Z_2$-actuator attached to the arm and that provides translation of the second gripper in the direction of the $Z_2$-axis independently of the $Z_1$-actuator.

8. The material handling system of claim 7 further comprising:
a $Y_1$-actuator attached to the $Z_1$-actuator and that provides translation of the first gripper in the direction of the $Y_1$-axis; and
a $Y_2$-actuator attached to the $Z_2$-actuator and that provides translation of the second gripper in the direction of the $Y_2$-axis independently of the $Y_1$-actuator.

9. The material handling system of claim 7 wherein:
at least one of the $Z_1$-actuator and the $Z_2$-actuator includes an inner sleeve that telescopes within an outer sleeve and a pair of telescope bearings disposed between the inner sleeve and the outer sleeve that support loads placed at any non-zero angle relative to a longitudinal axis of the inner and outer sleeves.

10. A mandrel segment loader comprising:
a bridge that translates relative to an arm in the directions of a $Z_1$-axis, a $Y_1$-axis, a $Z_2$-axis, and a $Y_2$-axis all independently of each other, and wherein:
the $Z_1$-axis and the $Y_1$-axis are perpendicular;
the $Z_2$-axis and the $Y_2$-axis are perpendicular;
the $Z_1$-axis and the $Z_2$-axis are parallel and maintained in fixed relation to each other and the arm;
coordinated motion of the bridge in the directions of the $Y_1$-axis and the $Y_2$-axis provides rotation of a mandrel segment about a C-axis that is a virtual axis perpendicular to the $Y_1$-axis and the $Y_2$-axis; and
coordinated motion of the bridge in the directions of the $Z_1$-axis and the $Z_2$-axis provides rotation of the mandrel segment about a B-axis that is a virtual axis perpendicular to the $Z_1$-axis and the $Z_2$-axis; and
a self-locking gripper that translates in the direction of an $X_1$-axis relative to the bridge and rotates about an A'-axis relative to the bridge.

11. The mandrel segment loader of claim 10 further comprising:
an arm that translates in the direction of a W-axis and rotates about an A-axis;
a $Z_1$-actuator attached to the arm that provides translation of the bridge in the direction of the $Z_1$-axis; and
a $Z_2$-actuator attached to the arm that provides translation of the bridge in the direction of the $Z_2$-axis independently of the $Z_1$-actuator, wherein:
each of the $Z_1$-actuator and the $Z_2$-actuator comprises a ball screw actuator with an inner sleeve that telescopes within an outer sleeve and a pair of ultra high molecular weight plastic telescope bearings disposed between the inner sleeve and the outer sleeve that support loads placed at any non-zero angle relative to a longitudinal axis of the inner and outer sleeves.

12. The mandrel segment loader of claim 11 further comprising:
a $Y_1$-actuator attached to the $Z_1$-actuator and to the bridge that provides translation of the bridge in the direction of the $Y_1$-axis; and
a $Y_2$-actuator attached to the $Z_2$-actuator that provides translation of the bridge in the direction of the $Y_2$-axis independently of the $Y_1$-actuator.

13. The mandrel segment loader of claim 12 further comprising:
a length adjustment mechanism wherein:
the bridge is attached to the $Y_1$-actuator via the length adjustment mechanism; and
the length adjustment mechanism compensates for changes in distance between the $Y_1$-actuator and $Y_2$-actuator as the bridge is moved in the directions of the $Z_1$-axis the $Z_2$-axis, and any combination of the $Z_1$-axis and the $Z_2$-axis.

14. The mandrel segment loader of claim 11 further comprising:
a chassis supported by wheels wherein:
the chassis provides motion of the mandrel segment loader across a floor in the direction of an X-axis and in the direction of a Y-axis in combination simultaneously so that movement is provided in any chosen direction across the floor; and
the chassis provides motion of the mandrel segment loader across the floor in the direction of the X-axis and in the direction of the Y-axis in combination simultaneously so that rotation of the mandrel segment centered at any chosen point is provided about a C'-axis that is perpendicular to both the X-axis and the Y-axis;
a mast attached to the chassis and providing support for translation of the arm and bridge in the direction of the W-axis; and
a lift truck carriage that slides along the mast in the direction of the W-axis, wherein the arm is mounted to the lift truck carriage so that the arm rotates about the A-axis.

15. The mandrel segment loader of claim 10 further comprising:
a car supported on rollers within guide tracks attached to the bridge and on a first and second side of the car, wherein:
the self-locking gripper is attached to the car;
movement of the car along the guide tracks provides translation in the direction of the $X_1$-axis of the self-locking gripper; and
the height of the car is differentially adjustable as between the first side and the second side of the car with respect to the guide tracks by adjusting the rollers about an eccentric so that the car rotates about an A'-axis parallel to the $X_1$-axis providing A'-axis rotation of the self-locking gripper.

16. A method of material handling comprising the operations of:
gripping the material using a first gripper and a second gripper;
carrying the first gripper and second gripper on a bridge having a $Y_1$-axis maintained perpendicular to a $Z_1$-axis and a $Y_2$-axis maintained perpendicular to a $Z_2$-axis, the bridge also having an $X_1$-axis maintained perpendicular to the $Y_2$-axis;

rotating the bridge about an A-axis on an arm, the arm having the $Z_1$-axis in fixed relation to the arm and perpendicular to the A-axis, and having the $Z_2$-axis in fixed relation to the arm and parallel to the $Z_1$-axis so that the $Z_1$-axis and the $Z_2$-axis rotate together about the A-axis;

translating the bridge relative to the arm along the $Z_1$-axis and $Z_2$-axis independently and translating the bridge relative to the arm along the $Y_1$-axis and the $Y_2$-axis independently;

translating the first gripper and the second gripper together along the $X_1$-axis;

translating the first gripper and the second gripper along the $Z_1$-axis and the $Z_2$-axis differentially to produce rotation of the material about a virtual B-axis perpendicular to the $Z_1$-axis and the $Z_2$-axis; and translating the first gripper and the second gripper along the $Y_1$-axis and the $Y_2$-axis differentially to produce rotation of the material about a virtual C-axis perpendicular to the $Y_1$-axis and the $Y_2$-axis.

17. The method of claim 16 wherein the gripping operation includes:

moving an actuator rod in a first direction to transmit force through a thumb control link and a finger control link to close the thumb and finger for engaging a bar attached to the material; and transmitting counter force tending to open the finger and the thumb back through the thumb control link and the finger control link to push the actuator rod in the first direction closing the thumb and the finger.

18. The method of claim 16 further comprising the operation of:

lifting the arm and material in the direction of a W-axis perpendicular to a floor.

19. The method of claim 16 further comprising the operation of:

transporting the material by moving the arm in the direction of an X-axis and a Y-axis simultaneously and in coordination to produce an overall translation and rotation of the material across a floor.

* * * * *